United States Patent
Neubauer et al.

(10) Patent No.: US 12,154,059 B2
(45) Date of Patent: Nov. 26, 2024

(54) TERRITORY SET DETERMINATION BASED ON HISTORICAL SERVICE EVENT DATA

(71) Applicant: HERE Global B.V., Eindhoven (NL)

(72) Inventors: Nicolas Neubauer, Berlin (DE); Sebastian van de Hoef, Berlin (DE); Amol Naik, Berlin (DE); Petros Kaplanidis, Berlin (DE)

(73) Assignee: Here Global B.V., Eindhoven (NL)

( * ) Notice: Subject to any disclaimer, the term of this patent is extended or adjusted under 35 U.S.C. 154(b) by 542 days.

(21) Appl. No.: 17/457,985

(22) Filed: Dec. 7, 2021

(65) Prior Publication Data
US 2023/0177444 A1    Jun. 8, 2023

(51) Int. Cl.
| | | |
|---|---|---|
| *G06Q 10/08* | (2024.01) | |
| *G05D 1/00* | (2024.01) | |
| *G06Q 10/0631* | (2023.01) | |

(52) U.S. Cl.
CPC .......... *G06Q 10/08* (2013.01); *G05D 1/0217* (2013.01); *G05D 1/0274* (2013.01); *G05D 1/0291* (2013.01); *G06Q 10/06315* (2013.01)

(58) Field of Classification Search
CPC ............ G06Q 10/08; G06Q 10/06315; G06Q 10/047; G05D 1/0217; G05D 1/0274; G05D 1/0291; G05D 2201/0216; G01C 21/3407; G01C 21/3461; G01C 21/3469
See application file for complete search history.

(56) References Cited

U.S. PATENT DOCUMENTS

| | | | | |
|---|---|---|---|---|
| 7,363,126 | B1 * | 4/2008 | Zhong | G01C 21/3484 701/25 |
| 8,032,402 | B2 * | 10/2011 | Aleksiejczyk | G06Q 10/06311 705/7.13 |
| 8,725,612 | B2 * | 5/2014 | Mundinger | G06Q 40/08 705/35 |
| 9,037,406 | B2 * | 5/2015 | Mason | G06Q 10/04 701/482 |
| 10,311,385 | B2 * | 6/2019 | Looman | G01C 21/3632 |
| 10,528,062 | B2 * | 1/2020 | Looman | G06Q 10/0833 |
| 11,468,386 | B2 * | 10/2022 | Beaumont | G06F 21/552 |
| 2010/0082194 | A1 * | 4/2010 | Yabushita | G05D 1/0274 701/25 |

(Continued)

FOREIGN PATENT DOCUMENTS

JP    2020004181 A2    1/2020

*Primary Examiner* — Michael Jared Walker
(74) *Attorney, Agent, or Firm* — Alston & Bird LLP

(57) ABSTRACT

Processors obtain instances of service event data and generate a plurality of territory sets. The processors determine a plurality of respective servicing values based at least in part on the instances of service event data. A respective servicing value is determined for each territory set of the plurality of territory sets. A respective servicing value for a respective territory set is determined based at least in part on at least one path that links the respective service locations located within a particular territory of the territory set on a particular service date. Based on the plurality of respective servicing values, a preferred territory set is identified from the plurality of territory sets. Responsive to determining that the preferred territory set satisfies one or more provision criteria, the processors cause information corresponding to the preferred territory set to be provided.

20 Claims, 9 Drawing Sheets

(56) References Cited

U.S. PATENT DOCUMENTS

| | | | |
|---|---|---|---|
| 2010/0241507 A1* | 9/2010 | Quinn | G06Q 30/0256 |
| | | | 705/14.42 |
| 2011/0213634 A1* | 9/2011 | Karakey | G06Q 10/06 |
| | | | 705/7.14 |
| 2012/0022908 A1* | 1/2012 | Sprimont | G06Q 10/063116 |
| | | | 705/7.16 |
| 2014/0222330 A1* | 8/2014 | Kohlenberg | G01C 21/3484 |
| | | | 701/425 |
| 2017/0270466 A1* | 9/2017 | Kao | G05D 1/0217 |
| 2019/0113356 A1* | 4/2019 | Fowe | G08G 1/0145 |
| 2020/0005240 A1* | 1/2020 | Ko | G06Q 10/08355 |
| 2020/0072631 A1* | 3/2020 | Fowe | G01C 21/3658 |
| 2020/0073966 A1* | 3/2020 | Fowe | G06F 16/285 |
| 2021/0097893 A1* | 4/2021 | Klappert | G06F 16/9024 |
| 2022/0335361 A1* | 10/2022 | Lois | G06F 16/285 |

* cited by examiner

TERRITORY SET DETERMINATION BASED ON HISTORICAL SERVICE EVENT DATA

TECHNOLOGICAL FIELD

An example embodiment relates generally to determining a territory set based on a servicing value determined based on historical service event data. An example embodiment relates generally to providing a determined territory set, organizing a loading dock and/or warehouse based on a territory set, and/or managing a fleet of vehicles based on a territory set.

BACKGROUND

Service providers commonly divide the geographical area within which the service provider performs service events into a set of territories. Each service event within a given territory is serviced by a dedicated one or more service provider units (e.g., service provider vehicles, service provider personnel, service provider contractors, and/or the like). Different territory sets may be preferred based on various service provider preferences and service event tour constraints. The territory set in use is not easily modified or changed as warehouses, loading docks, service provider contracts, and/or the like may be organized based on and/or reference particular territories and/or the in use territory set.

BRIEF SUMMARY OF SOME EXAMPLE EMBODIMENTS

Various embodiments are directed to determining a preferred territory set based on historical service event data. An instance of service event data comprises a location corresponding to a respective service event and a date corresponding to the respective service event. Candidate territory sets are generated and a respective servicing value for one or more candidate territory sets and/or for the current territory set are determined based on service provider preferences and service event tour constraints. In an example embodiment, the candidate territory sets are generated and/or filtered based on service event tour constraints. Based on the determined servicing values, a preferred territory set is identified. When the servicing value determined for the preferred territory set is determined to satisfy one or more provision criteria, the information regarding the preferred territory set is provided.

For example, an example embodiment, a graphical representation of at least a portion of the preferred territory set is provided (e.g., displayed via a user interface). In an example embodiment, a data file encoding the preferred territory set is provided (e.g., stored to database). In an example embodiment, a warehouse/loading dock arrangement trigger is generated and/or identified based on the determination that the servicing value for the preferred territory set satisfies the one or more provision criteria. In an example embodiment, a warehouse/loading dock arrangement is determined and provided and/or used to cause the re-organization and/or arrangement of the warehouse/loading dock based on the determination that the servicing value for the preferred territory set satisfies the one or more provision criteria.

In an example embodiment, the preferred territory set is provided as input to a fleet management program, application, and/or the like used to manage servicing the geographical area using a fleet of vehicles and/or personnel/contractors. For example, respective vehicles of a fleet of vehicles may each be assigned to a respective territory of the preferred territory set, routes for respective vehicles may be generated and/or determined based on the preferred territory set, associating generated and/or determined routes with respective vehicles of the fleet may be performed based at least in part on the preferred territory set, and/or the like. For example, the preferred territory set effectively reduces the route search area used to determine the routes used by respective vehicles of the fleet and the number of destinations considered for each route during the route planning phase.

In various embodiments, one or more processors obtain a plurality of instances of service event data. Each instance of service event data comprises a respective location indicator configured to indicate a respective service location associated with a respective service event and a respective service date indicator configured to indicate a respective service date associated with the respective service event. The one or more processors obtain defined area data defining a plurality of defined areas. The plurality of defined areas are configured to partition a geographical area corresponding to the instances of service event data. The one or more processors generate a plurality of territory sets. Each territory set of the plurality of territory sets comprises a respective number of territories with each territory of the respective number of territories comprising one or more defined areas of the plurality of defined areas such that each defined area of the plurality of defined areas is assigned to exactly one respective territory of the number of territories. The one or more processors determine a plurality of respective servicing values based at least in part on the plurality of instances of service event data. A respective servicing value is determined for each territory set of the plurality of territory sets and a respective servicing value for a respective territory set is determined based at least in part on a path that links the respective service locations located within a particular territory of the territory set on a particular service date. Based on the plurality of respective servicing values, the one or more processors identify a preferred territory set of the plurality of territory sets. Responsive to determining that the preferred territory set satisfies one or more provision criteria, the one or more processors cause information corresponding to the preferred territory set to be provided.

According to one aspect, a method for identifying and providing a preferred territory set. In an example embodiment, the method comprises obtaining, by one or more processors, a plurality of instances of service event data. Each instance of service event data comprises a respective location indicator configured to indicate a respective service location associated with a respective service event and a respective service date indicator configured to indicate a respective service date associated with the respective service event. The method further comprises obtaining, by the one or more processors, defined area data defining a plurality of defined areas. The plurality of defined areas are configured to partition a geographical area corresponding to the instances of service event data. The method further comprises generating, by the one or more processors, a plurality of territory sets. Each territory set of the plurality of territory sets comprises a respective number of territories with each territory of the respective number of territories comprising one or more defined areas of the plurality of defined areas such that each defined area of the plurality of defined areas is assigned to exactly one respective territory of the number of territories. The method further comprises determining, by the one or more processors, a plurality of respective servicing values based at least in part on the plurality of instances of service event data. A respective servicing value is determined for each territory set of the plurality of territory sets and a respective servicing value for a respective territory set is determined based at least in part on a path that links the respective service locations located within a particular territory of the territory set on a particular service date. The method further comprises identifying, by the one or more processors, a preferred territory set of the plurality of territory sets based on the plurality of respective servicing values; and responsive to determining that the preferred territory set satisfies one or more provision criteria, causing, by the one or more processors, information corresponding to the preferred territory set to be provided.

In an example embodiment, providing information corresponding to the preferred territory set comprises causing a user interface to display a graphical representation of at least a portion of the preferred territory set.

In an example embodiment, providing information corresponding to the preferred territory set comprises at least one of (a) determining a warehouse and/or loading dock rearrangement plan or (b) providing an indication that a trigger for determining a warehouse and/or loading dock rearrangement plan has been identified.

In an example embodiment, providing information corresponding to the preferred territory set comprises at least one of (a) providing the information corresponding to the preferred territory set to a route planner or (b) assigning respective vehicles of a fleet of vehicles to respective territories, wherein a vehicle of the fleet of vehicles is assigned to only one territory of the preferred territory set.

In an example embodiment, determining the respective servicing value for a particular territory set of the plurality of territory sets comprises grouping the plurality of instances of service event data into a plurality of groups, each group of the plurality of groups corresponding to a respective service date and a respective territory of the particular territory set; for each group of the plurality of groups, determining at least one respective path linking the respective service locations corresponding to the instances of service event data assigned to the group; and determining a path servicing value for the at least one respective path.

In an example embodiment, the respective servicing value for the territory set is determined by summing the path servicing value for the respective path of each group of the plurality of groups.

In an example embodiment, the path servicing value is determined based at least in part on map data corresponding to the respective path.

In an example embodiment, the path servicing value is determined based at least in part on at least one of: a length of the respective path, a travel time to traverse the respective path, an energy usage to traverse the respective path, a carbon emission emitted to traverse the respective path, or whether the path is traversable by an automated vehicle.

In an example embodiment, the method further comprise clustering substantially similar groups to form a cluster of groups, wherein determining the path servicing value for the respective path comprises determining a representative path servicing value for the cluster and assigning each group of the cluster the representative path servicing value.

In an example embodiment, the method further comprises filtering the plurality of territory sets based on one or more group criteria and/or path criteria.

In an example embodiment, the one or more group criteria and/or path criteria correspond to at least one of a maximum number of instances of service event data in any group of the plurality of groups, a minimum number of instances of service event data in any group of the plurality of groups, a maximum length of any respective path, a maximum travel time of any respective path, a maximum energy usage of any respective path, or a maximum carbon emission of any respective path.

In an example embodiment, at least one territory set of the plurality of territory sets is generated by applying a perturbation to a current territory set.

In an example embodiment, applying the perturbation to the current territory set comprises changing each territory of the current territory set by no more than removal of one defined area from each territory of the current territory set and addition of one defined area to each territory of the current territory set.

In an example embodiment, it is determined that the preferred territory set satisfies the one or more provision criteria when at least one of (a) the respective servicing value for the preferred territory set indicates a set amount of improvement over the respective servicing value for a current territory set or (b) the respective servicing value for the preferred territory set indicates a set percentage of improvement over the respective servicing value for the current territory set.

In another aspect, an apparatus (e.g., a network apparatus) is provided. In an example embodiment, the apparatus comprises at least one processor and at least one memory storing computer program code. The at least one memory and the computer program code are configured to, with the processor, cause the apparatus to at least obtain a plurality of instances of service event data. Each instance of service event data comprises a respective location indicator configured to indicate a respective service location associated with a respective service event and a respective service date indicator configured to indicate a respective service date associated with the respective service event. The at least one memory and the computer program code are further configured to, with the processor, cause the apparatus to at least obtain defined area data defining a plurality of defined areas. The plurality of defined areas are configured to partition a geographical area corresponding to the instances of service event data. The at least one memory and the computer program code are further configured to, with the processor, cause the apparatus to at least generate a plurality of territory sets. Each territory set of the plurality of territory sets comprises a respective number of territories with each territory of the respective number of territories comprising one or more defined areas of the plurality of defined areas such that each defined area of the plurality of defined areas is assigned to exactly one respective territory of the number of territories. The at least one memory and the computer program code are further configured to, with the processor, cause the apparatus to at least determine a plurality of respective servicing values based at least in part on the plurality of instances of service event data. A respective servicing value is determined for each territory set of the plurality of territory sets and a respective servicing value for a respective territory set is determined based at least in part on a path that links the respective service locations located within a particular territory of the territory set on a particular service date. The at least one memory and the computer program code are further configured to, with the processor, cause the apparatus to at least identify a preferred territory set of the plurality of territory sets based on the plurality of respective servicing values; and responsive to determining that the preferred territory set satisfies one or more provision criteria, cause information corresponding to the preferred territory set to be provided.

In an example embodiment, providing information corresponding to the preferred territory set comprises causing a user interface to display a graphical representation of at least a portion of the preferred territory set.

In an example embodiment, providing information corresponding to the preferred territory set comprises at least one of (a) determining a warehouse and/or loading dock rearrangement plan or (b) providing an indication that a trigger for determining a warehouse and/or loading dock rearrangement plan has been identified.

In an example embodiment, providing information corresponding to the preferred territory set comprises at least one of (a) providing the information corresponding to the preferred territory set to a route planner or (b) assigning respective vehicles of a fleet of vehicles to respective territories, wherein a vehicle of the fleet of vehicles is assigned to only one territory of the preferred territory set.

In an example embodiment, determining the respective servicing value for a particular territory set of the plurality of territory sets comprises grouping the plurality of instances of service event data into a plurality of groups, each group of the plurality of groups corresponding to a respective service date and a respective territory of the particular territory set; for each group of the plurality of groups, determining a respective set of paths, wherein one or more paths of the set of paths collectively link respective subsets of the respective service locations corresponding to the instances of service event data assigned to the group; and determining an aggregate path servicing value for the respective set of paths.

In an example embodiment, the respective servicing value for the territory set is determined by summing the path servicing value for the respective path of each group of the plurality of groups.

In an example embodiment, the path servicing value is determined based at least in part on map data corresponding to the respective path.

In an example embodiment, the path servicing value is determined based at least in part on at least one of: a length of the respective path, a travel time to traverse the respective path, an energy usage to traverse the respective path, a carbon emission emitted to traverse the respective path, or whether the path is traversable by an automated vehicle.

In an example embodiment, the at least one memory and the computer program code are further configured to, with the processor, cause the apparatus to at least cluster substantially similar groups to form a cluster of groups, wherein determining the path servicing value for the respective path comprises determining a representative path servicing value for the cluster and assigning each group of the cluster the representative path servicing value.

In an example embodiment, the at least one memory and the computer program code are further configured to, with the processor, cause the apparatus to at least filter the plurality of territory sets based on one or more group criteria and/or path criteria.

In an example embodiment, the one or more group criteria and/or path criteria correspond to at least one of a maximum number of instances of service event data in any group of the plurality of groups, a minimum number of instances of service event data in any group of the plurality of groups, a maximum length of any respective path, a maximum travel time of any respective path, a maximum energy usage of any respective path, or a maximum carbon emission of any respective path.

In an example embodiment, at least one territory set of the plurality of territory sets is generated by applying a perturbation to a current territory set.

In an example embodiment, applying the perturbation to the current territory set comprises changing each territory of the current territory set by no more than removal of one defined area from each territory of the current territory set and addition of one defined area to each territory of the current territory set.

In an example embodiment, it is determined that the preferred territory set satisfies the one or more provision criteria when at least one of (a) the respective servicing value for the preferred territory set indicates a set amount of improvement over the respective servicing value for a current territory set or (b) the respective servicing value for the preferred territory set indicates a set percentage of improvement over the respective servicing value for the current territory set.

In yet another aspect, a computer program product is provided that comprises at least one non-transitory computer-readable storage medium having computer-executable program code instructions stored therein. The computer-executable program code instructions comprise program code instructions that are configured, when executed by a processor of an apparatus, to cause the apparatus to obtain a plurality of instances of service event data. Each instance of service event data comprises a respective location indicator configured to indicate a respective service location associated with a respective service event and a respective service date indicator configured to indicate a respective service date associated with the respective service event. The computer-executable program code instructions comprise program code instructions that are further configured, when executed by a processor of an apparatus, to cause the apparatus to obtain defined area data defining a plurality of defined areas. The plurality of defined areas are configured to partition a geographical area corresponding to the instances of service event data. The computer-executable program code instructions comprise program code instructions that are further configured, when executed by a processor of an apparatus, to cause the apparatus to generate a plurality of territory sets. Each territory set of the plurality of territory sets comprises a respective number of territories with each territory of the respective number of territories comprising one or more defined areas of the plurality of defined areas such that each defined area of the plurality of defined areas is assigned to exactly one respective territory of the number of territories. The computer-executable program code instructions comprise program code instructions that are further configured, when executed by a processor of an apparatus, to cause the apparatus to determine a plurality of respective servicing values based at least in part on the plurality of instances of service event data. A respective servicing value is determined for each territory set of the plurality of territory sets and a respective servicing value for a respective territory set is determined based at least in part on a path that links the respective service locations located within a particular territory of the territory set on a particular service date. The computer-executable program code instructions comprise program code instructions that are further configured, when executed by a processor of an apparatus, to cause the apparatus to identify a preferred territory set of the plurality of territory sets based on the plurality of respective servicing values; and responsive to determining that the preferred territory set satisfies one or more provision criteria, cause information corresponding to the preferred territory set to be provided.

Also, a computer program product may be provided. For example, a computer program product comprising instructions which, when the program is executed by a computer, cause the computer to carry out the steps described herein.

In an example embodiment, providing information corresponding to the preferred territory set comprises causing a user interface to display a graphical representation of at least a portion of the preferred territory set.

In an example embodiment, providing information corresponding to the preferred territory set comprises at least one of (a) determining a warehouse and/or loading dock rearrangement plan or (b) providing an indication that a trigger for determining a warehouse and/or loading dock rearrangement plan has been identified.

In an example embodiment, providing information corresponding to the preferred territory set comprises at least one of (a) providing the information corresponding to the preferred territory set to a route planner or (b) assigning respective vehicles of a fleet of vehicles to respective territories, wherein a vehicle of the fleet of vehicles is assigned to only one territory of the preferred territory set.

In an example embodiment, determining the respective servicing value for a particular territory set of the plurality of territory sets comprises grouping the plurality of instances of service event data into a plurality of groups, each group of the plurality of groups corresponding to a respective service date and a respective territory of the particular territory set; for each group of the plurality of groups, determining a respective set of paths, wherein one or more paths of the set of paths collectively link respective subsets of the respective service locations corresponding to the instances of service event data assigned to the group; and determining an aggregate path servicing value for the respective set of paths.

In an example embodiment, the respective servicing value for the territory set is determined by summing the path servicing value for the respective path of each group of the plurality of groups.

In an example embodiment, the path servicing value is determined based at least in part on map data corresponding to the respective path.

In an example embodiment, the path servicing value is determined based at least in part on at least one of: a length of the respective path, a travel time to traverse the respective path, an energy usage to traverse the respective path, a carbon emission emitted to traverse the respective path, or whether the path is traversable by an automated vehicle.

In an example embodiment, the computer-executable program code instructions comprise program code instructions that are further configured, when executed by a processor of an apparatus, to cause the apparatus to cluster substantially similar groups to form a cluster of groups, wherein determining the path servicing value for the respective path comprises determining a representative path servicing value for the cluster and assigning each group of the cluster the representative path servicing value.

In an example embodiment, the computer-executable program code instructions comprise program code instructions that are further configured, when executed by a processor of an apparatus, to cause the apparatus to filter the plurality of territory sets based on one or more group criteria and/or path criteria.

In an example embodiment, the one or more group criteria and/or path criteria correspond to at least one of a maximum number of instances of service event data in any group of the plurality of groups, a minimum number of instances of service event data in any group of the plurality of groups, a maximum length of any respective path, a maximum travel time of any respective path, a maximum energy usage of any respective path, or a maximum carbon emission of any respective path.

In an example embodiment, at least one territory set of the plurality of territory sets is generated by applying a perturbation to a current territory set.

In an example embodiment, applying the perturbation to the current territory set comprises changing each territory of the current territory set by no more than removal of one defined area from each territory of the current territory set and addition of one defined area to each territory of the current territory set.

In an example embodiment, it is determined that the preferred territory set satisfies the one or more provision criteria when at least one of (a) the respective servicing value for the preferred territory set indicates a set amount of improvement over the respective servicing value for a current territory set or (b) the respective servicing value for the preferred territory set indicates a set percentage of improvement over the respective servicing value for the current territory set.

In accordance with still another aspect, an apparatus is provided. In an example embodiment, the apparatus comprises means for obtaining a plurality of instances of service event data. Each instance of service event data comprises a respective location indicator configured to indicate a respective service location associated with a respective service event and a respective service date indicator configured to indicate a respective service date associated with the respective service event. The apparatus comprises means for obtaining defined area data defining a plurality of defined areas. The plurality of defined areas are configured to partition a geographical area corresponding to the instances of service event data. The apparatus comprises means for generating a plurality of territory sets. Each territory set of the plurality of territory sets comprises a respective number of territories with each territory of the respective number of territories comprising one or more defined areas of the plurality of defined areas such that each defined area of the plurality of defined areas is assigned to exactly one respective territory of the number of territories. The apparatus comprises means for determining a plurality of respective servicing values based at least in part on the plurality of instances of service event data. A respective servicing value is determined for each territory set of the plurality of territory sets and a respective servicing value for a respective territory set is determined based at least in part on a path that links the respective service locations located within a particular territory of the territory set on a particular service date. The apparatus comprises means for identifying a preferred territory set of the plurality of territory sets based on the plurality of respective servicing values. The apparatus comprises means for causing information corresponding to the preferred territory set to be provided responsive to determining that the preferred territory set satisfies one or more provision criteria.

BRIEF DESCRIPTION OF THE DRAWINGS

Figure 1:
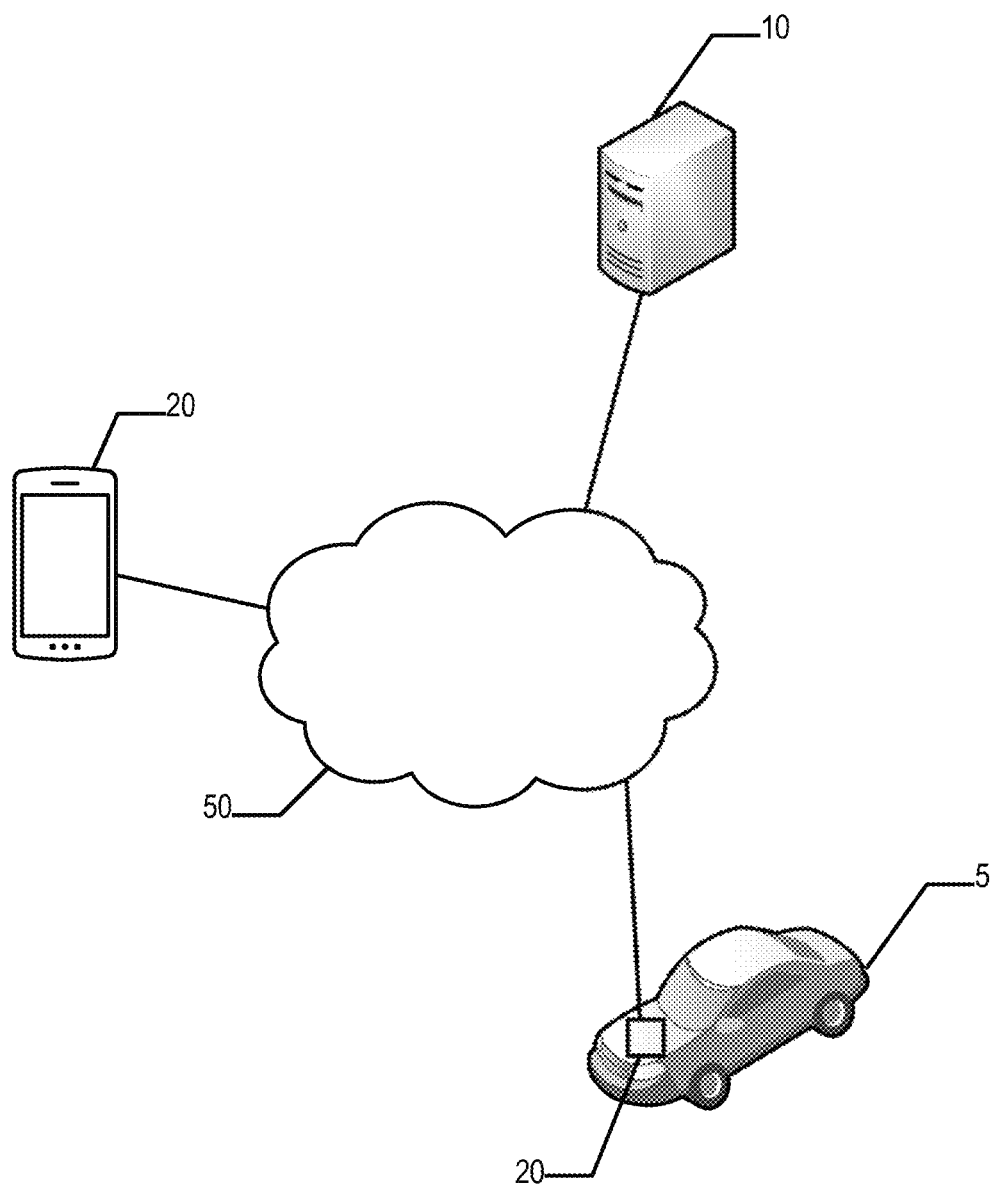
Figure 2A:
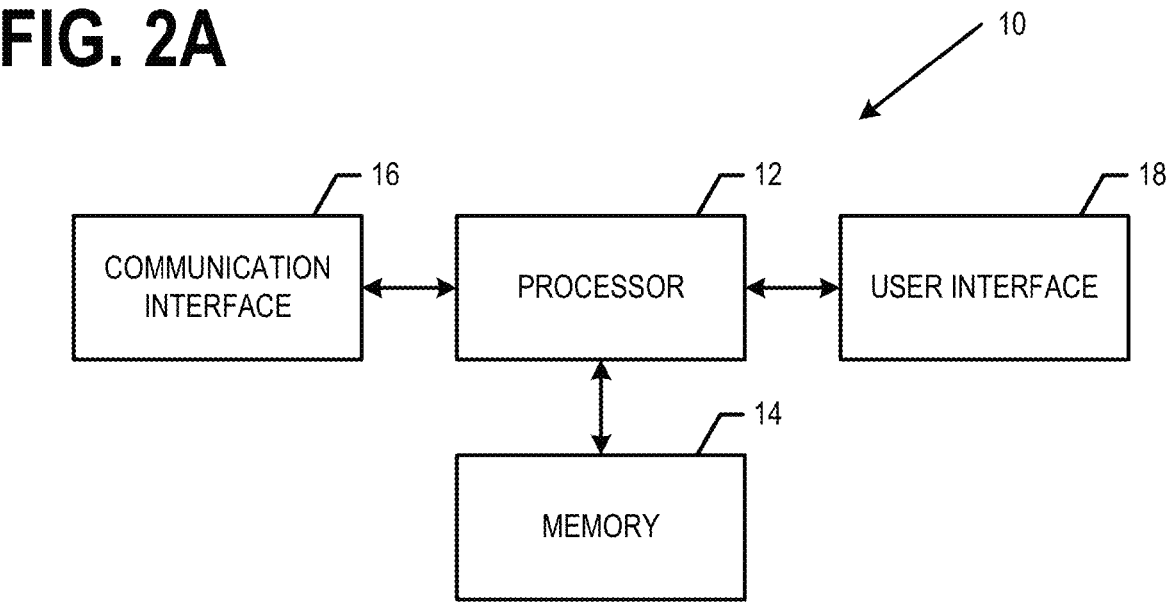
Figure 2B:
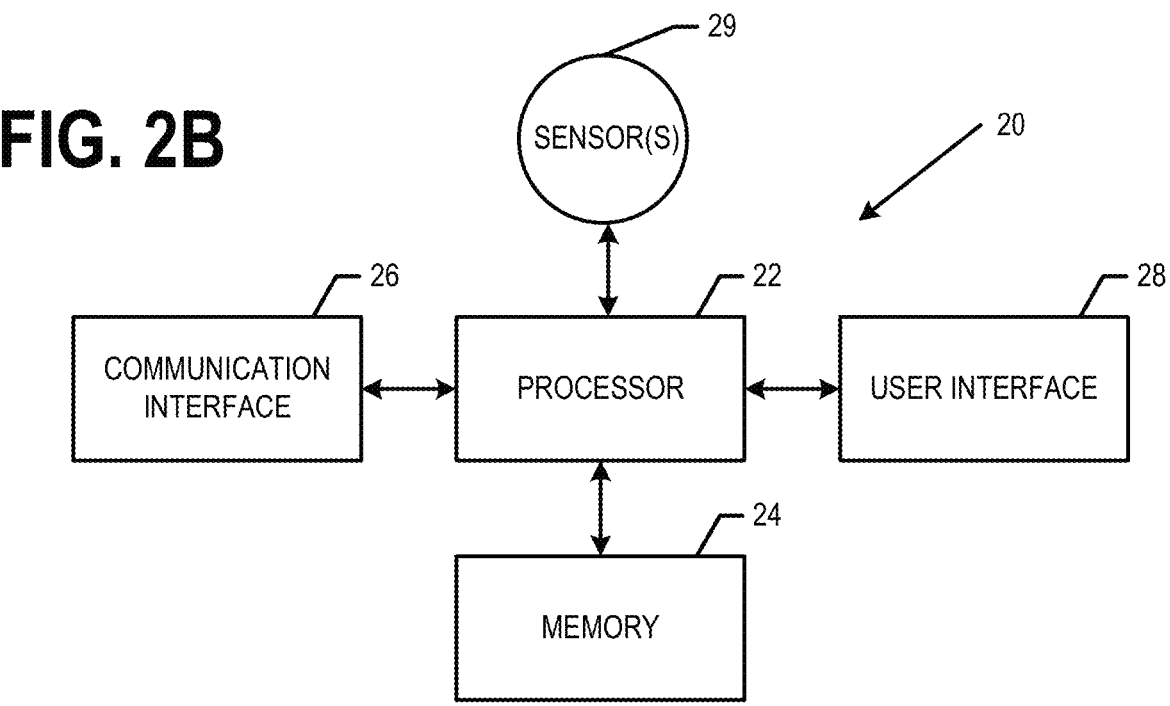
Figure 3:
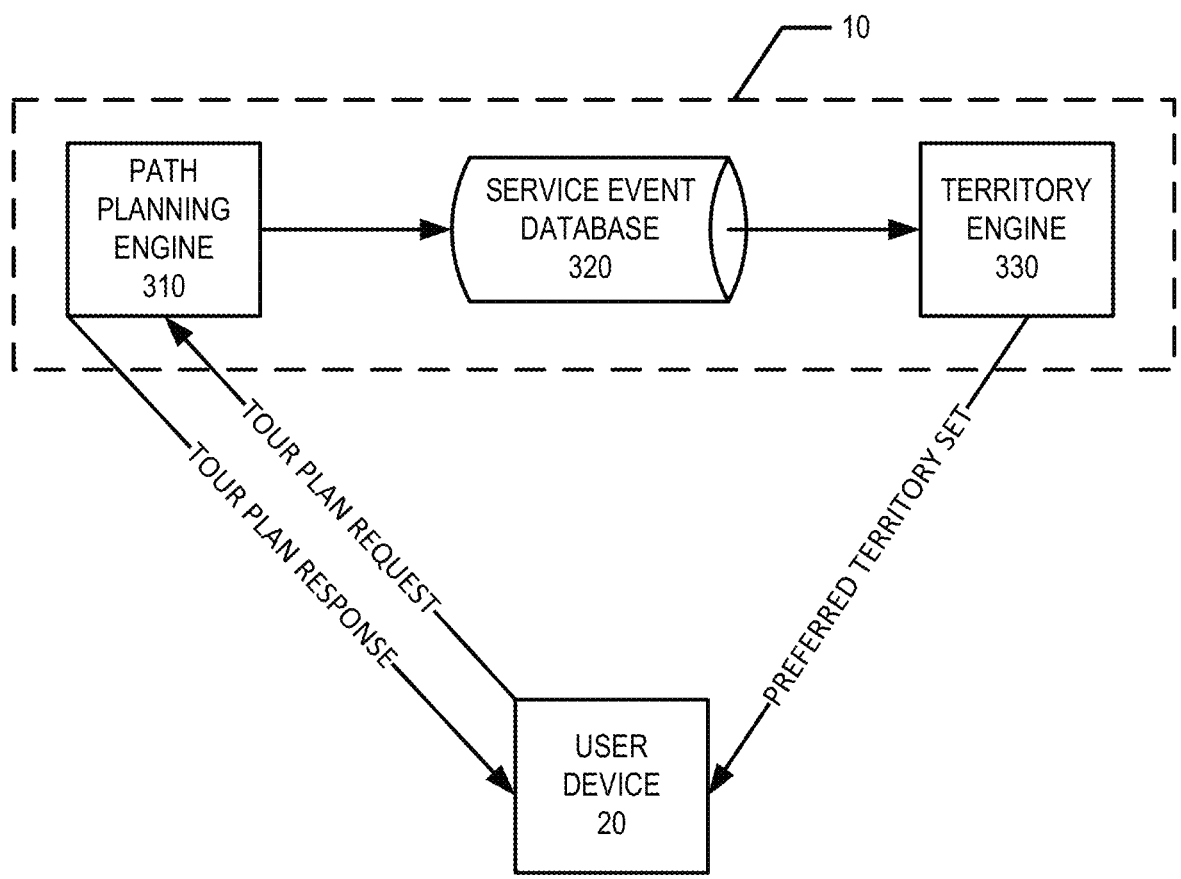
Figure 4:
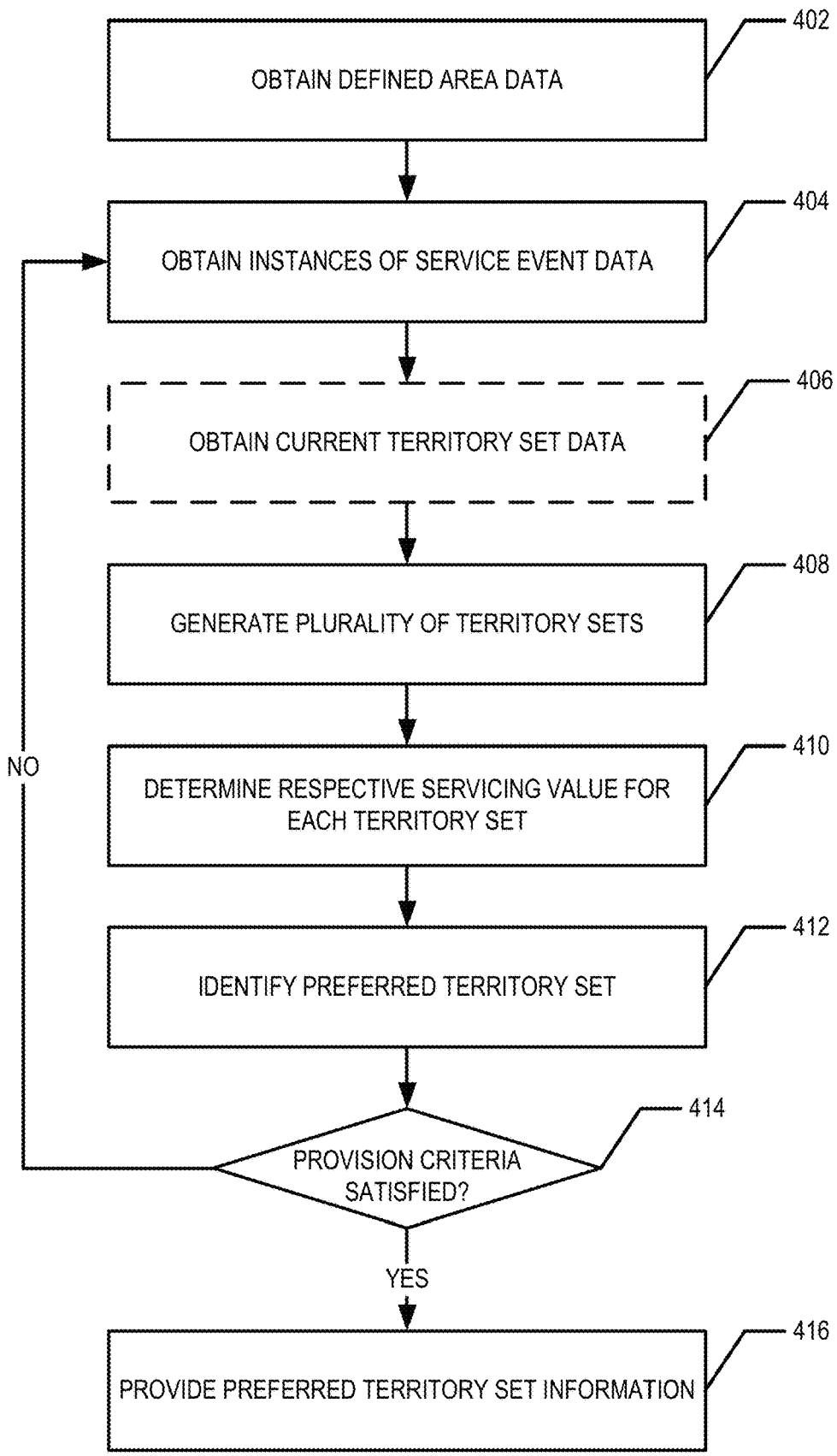
Figure 5:
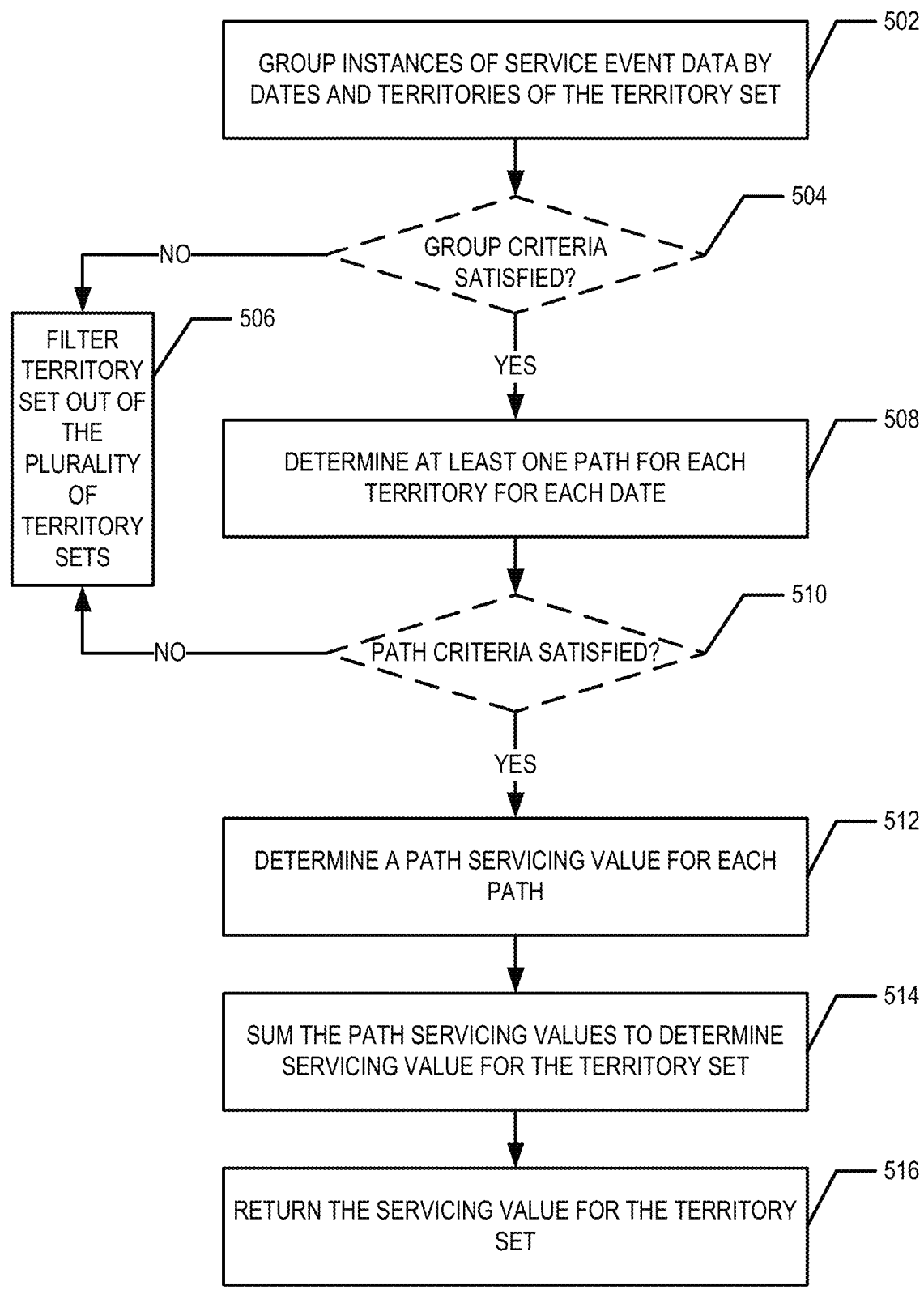
Figure 6A:
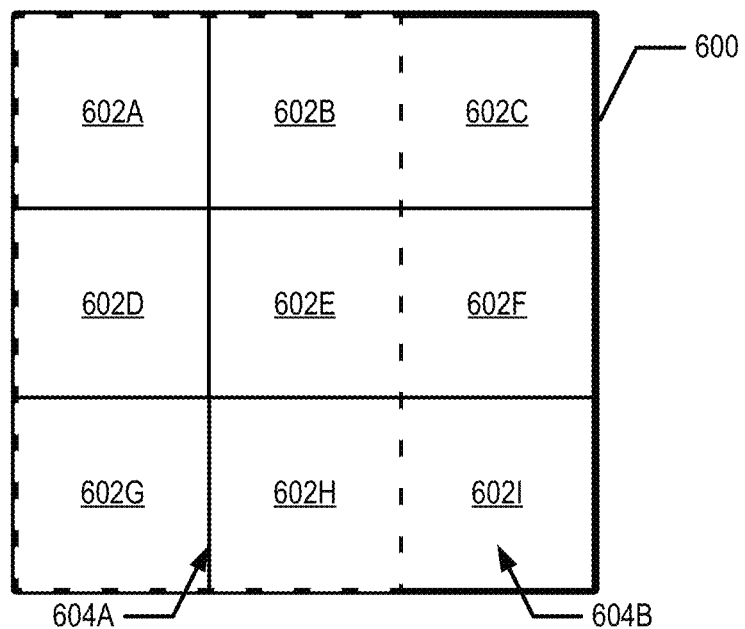
Figure 6B:
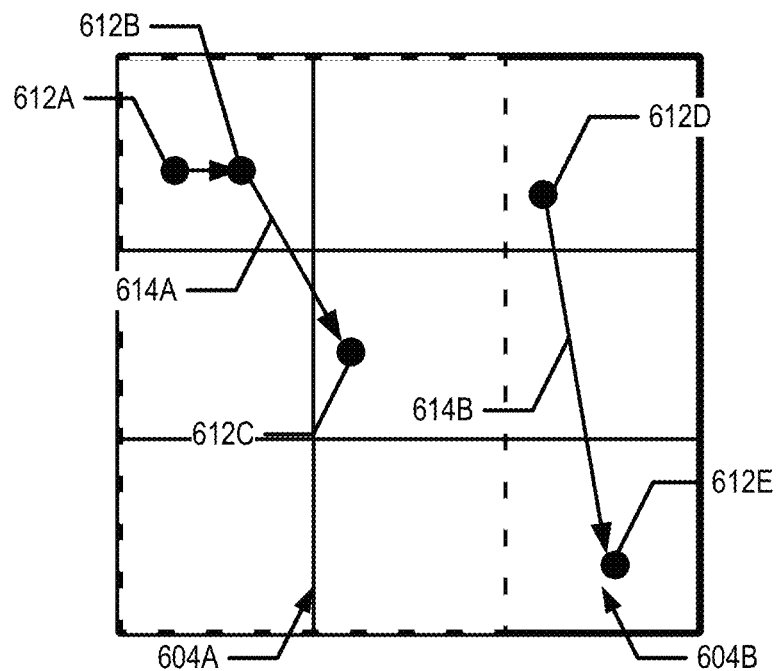
Figure 6C:
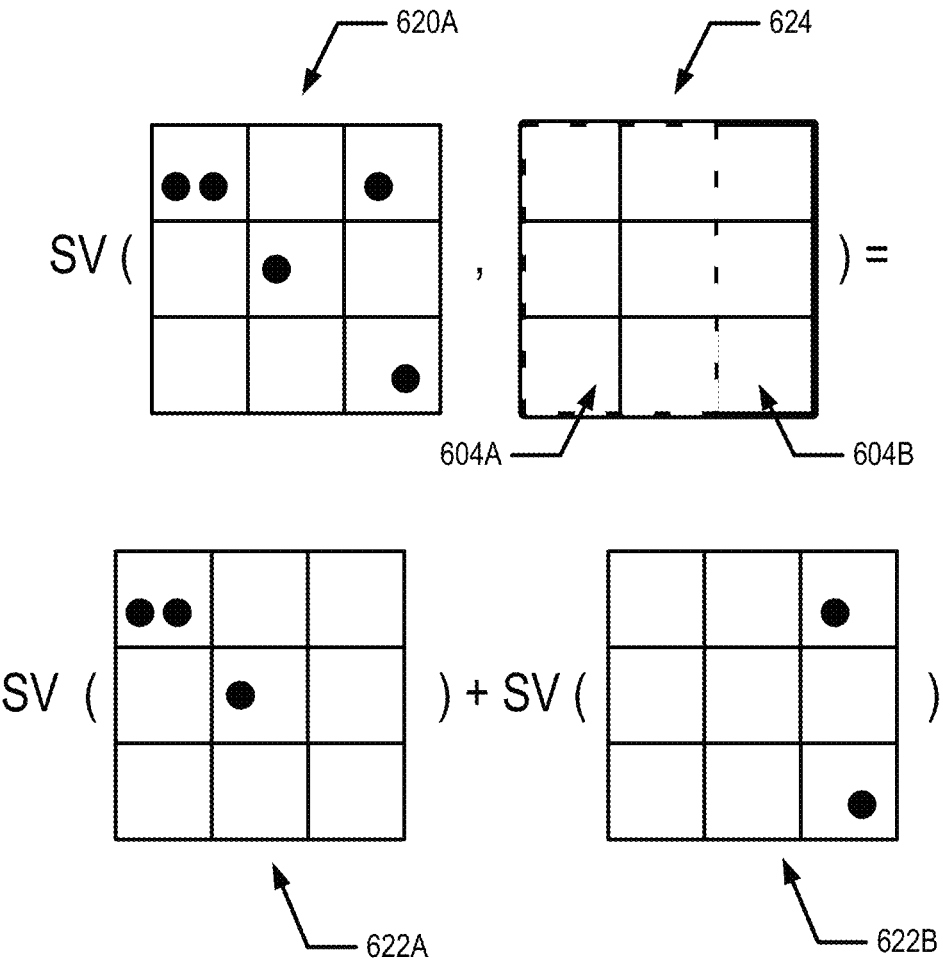
Figure 6D:
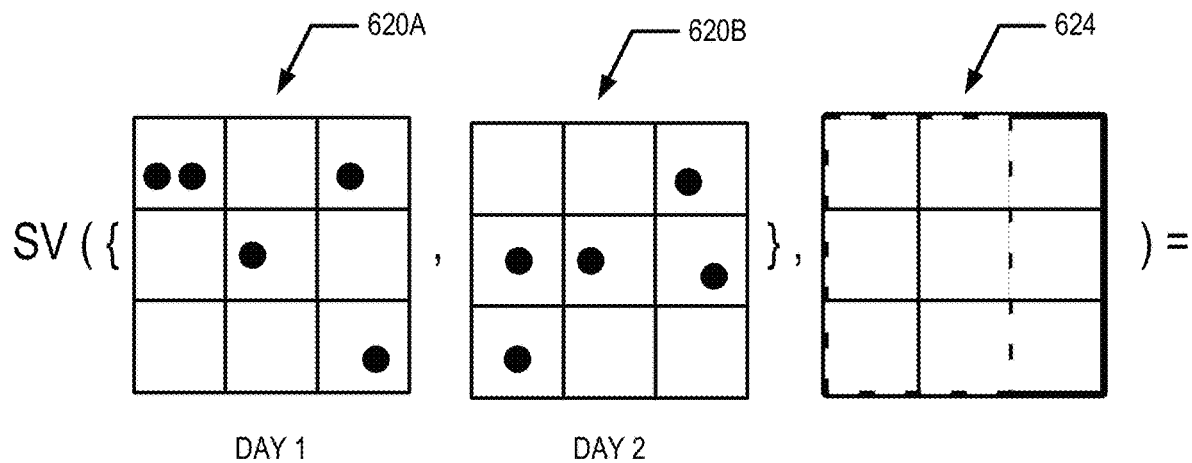
Figure 6D:
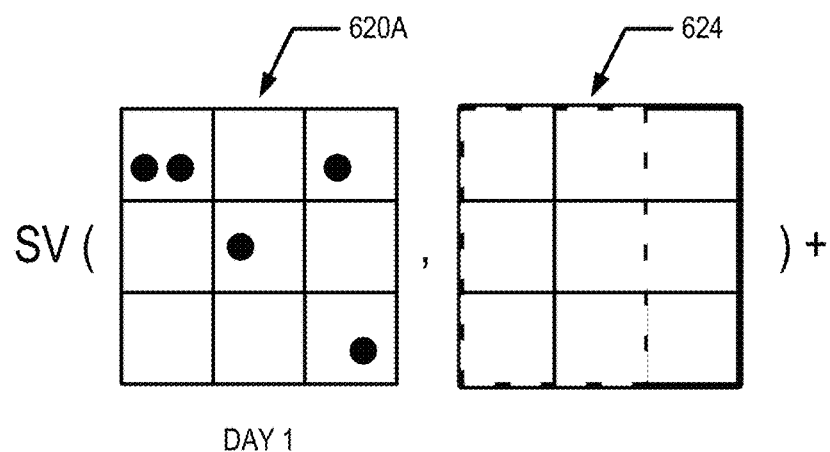
Figure 6D:
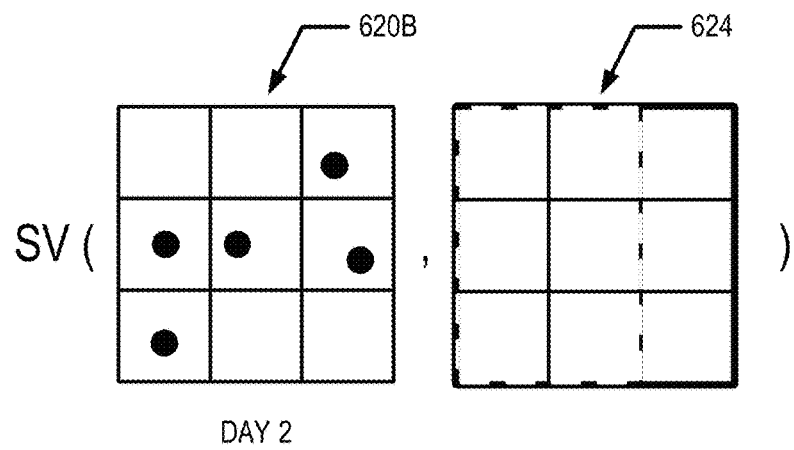
Figure 7:
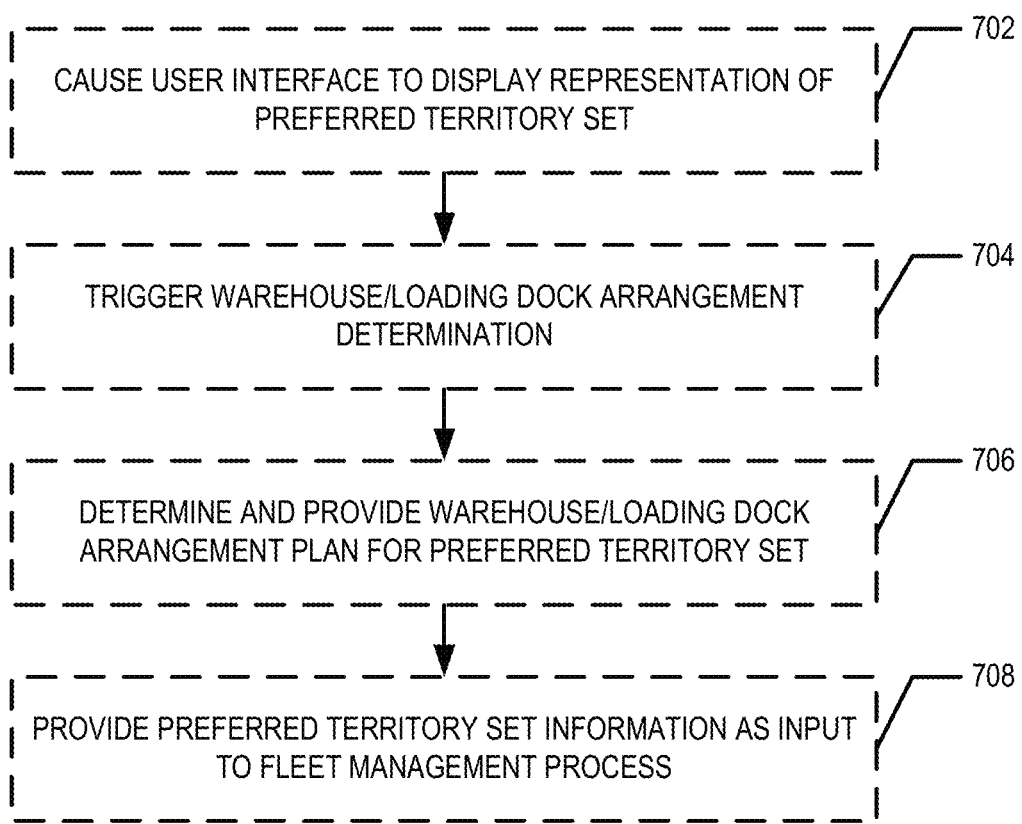

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a network apparatus that may be specifically configured in accordance with an example embodiment;

FIG. 2B is a block diagram of a user apparatus that may be specifically configured in accordance with an example embodiment;

FIG. 3 is a block diagram illustrating a system that may be used to perform on embodiment of the present invention;

FIG. 4 is a flowchart illustrating operations performed, such as by the network apparatus of FIG. 2A, to determine and provide preferred territory set information, in accordance with an example embodiment;

FIG. 5 is a flowchart illustrating operations performed, such as by the network apparatus of FIG. 2A, to determine a servicing value for a territory set, in accordance with an example embodiment;

FIGS. 6A, 6B, 6C, and 6D illustrate various aspects of determining a servicing value for a territory set, in accordance with an example embodiment; and FIG. 7 is a flowchart illustrating operations performed, such as by the network apparatus of FIG. 2A, to provide preferred territory set information.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

I. General Overview

Methods, apparatus, systems, and computer program products are provided in accordance with an example embodiment to determine a preferred territory set based on historical service event data. An instance of service event data comprises a location corresponding to a respective service event and a date corresponding to the respective service event. Candidate territory sets are generated and a respective servicing value for one or more candidate territory sets and/or for the current territory set are determined based on service provider preferences and service event tour constraints. In an example embodiment, to determine the servicing value for a territory set, the instances of service event data are grouped by date and territory and the servicing value for the territory set is determined based on the resulting groups of instances of service event data. In an example embodiment, the candidate territory sets are generated and/or filtered based on service event tour constraints and/or service provider preferences. Based on the determined servicing values, a preferred territory set is identified. When the servicing value determined for the preferred territory set is determined to satisfy one or more provision criteria, the information regarding the preferred territory set is provided.

For example, in an example embodiment, a graphical representation of at least a portion of the preferred territory set is provided (e.g., displayed via a user interface). In an example embodiment, a data file encoding the preferred territory set is provided (e.g., stored to database or provided as input to another application or program). In an example embodiment, a warehouse/loading dock arrangement trigger is generated and/or identified based on the determination that the servicing value for the preferred territory set satisfies the one or more provision criteria. In an example embodiment, a warehouse/loading dock arrangement is determined and provided and/or used to cause the re-organization and/or arrangement of the warehouse/loading dock based on the determination that the servicing value for the preferred territory set satisfies the one or more provision criteria.

In various embodiments, the historical instances of service event data correspond to service events performed (e.g., by the service provider, personnel associated with service provider, contractors of the service provider) over a period of time (e.g., a day, a week, two weeks, a month, two months, three months, half a year, a year, and/or the like). In an example embodiment, the service event is the delivery or pick-up of a package or item. Each instance of service event data is associated with and/or comprises a respective service date and/or respective service date indicator that indicates the date the respective service event was performed and a respective service location and/or respective service location indicator indicating where the respective service event was performed.

To determine a servicing value for a territory set, the instances of service event data are grouped into groups of instances of service event data with each group consisting of instances of service event data having a same service date associated therewith and respective service locations that are located within the same territory of the territory set. For each group, a path is determined and/or accessed (e.g., from a database that stores paths used to perform series of historical service events) that has legs that extend between the service locations of a group of instances of service event data such that each service location of the group is visited once. A path servicing value is then determined for the respective paths determined for each of the respective groups corresponding to the territory set. For example, in an example embodiment, each leg of a path is assigned a leg servicing value. The leg servicing values corresponding to the legs of a path are summed to determine the path servicing value. A date servicing value is then determined by summing (e.g., adding together) the path servicing values for all of the groups having the same service date. The date servicing values may then be summed (e.g., added together) to determine a servicing value for the territory set.

In various embodiments, the leg servicing value is determined based at least in part on a length of the leg, a time used and/or predicted for traversing the leg, an amount energy used or expected to be used to traverse the leg, an amount of carbon emission emitted and/or expected to be emitted when traversing the leg, how much of the leg can be navigated by an automated and/or self-driving vehicle, and/or other criteria. In various embodiments, the leg servicing value is determined based at least in part on map data corresponding to traversable path network segments and/or lanes corresponding to the leg.

In various embodiments, respective servicing values may be determined for each of a current territory set and/or one or more candidate territory sets. In various embodiments, the candidate territory sets may be generated based on service provider preferences.

In various embodiments, the one or more candidate territory sets are filtered based at least in part on service provider tour constraints that provide various constraints on the paths (e.g., total length of the path, total time to traverse the path, total energy expenditure along the path, total number of service events along the path (e.g., number of legs of the path), total carbon emissions for traversing the path, number and/or percentage of paths that are traversable by an automated and/or self-driving vehicle, and/or the like).

II. Example System

FIG. 1 provides an illustration of an example system that can be used in conjunction with various embodiments of the present invention. As shown in FIG. 1, the system may include one or more network apparatuses 10, one or more user apparatuses 20, one or more networks 50, and/or the like.

In various embodiments, the user apparatus 20 is a mobile computing device, smartphone, tablet, laptop, client device, desktop computer, and/or the like. For example, a user apparatus 20 may be configured for interaction with a human user. In an example embodiment, the network apparatus 10 may be a server, group of servers, distributed computing system, and/or other computing system. For example, the network apparatus 10 may be in communication with one or more user apparatuses 20, and/or the like via one or more wired or wireless networks 50. While the network apparatus 10 is generally described herein as a single computing entity, in various embodiments, the functions described herein as being performed by the network apparatus 10 may be performed by one or more of multiple network apparatuses 10.

In an example embodiment, a network apparatus 10 may comprise components similar to those shown in the example network apparatus 10 diagrammed in FIG. 2A. In an example embodiment, the network apparatus 10 is configured to determine and/or generate one or more candidate territory sets, use map data of a digital map to determine service event tours, determine respective servicing values for respective ones of the one or more candidate territory sets and/or the current territory set, identify a preferred territory set based at least in part on the determined respective servicing values, determine whether the preferred territory set satisfies one or more provision criteria, provide information corresponding to the preferred territory set when the preferred territory set satisfies the one or more provision criteria, and/or the like. For example, as shown in FIG. 2A, the network apparatus 10 may comprise a processor 12, memory 14, a user interface 18, a communications interface 16, and/or other components configured to perform various operations, procedures, functions or the like described herein. In at least some example embodiments, the memory 14 is non-transitory.

In an example embodiment, a user apparatus 20 is configured to request and receive information regarding a service event tour for performing the servicing events having service locations located within a respective territory and service dates of a respective date; receive and provide (e.g., display) information corresponding to a preferred territory set, a warehouse/loading dock re-organization and/or arrangement determined based on a preferred territory set; and/or the like. In an example embodiment, as shown in FIG. 2B, the user apparatus 20 may comprise a processor 22, memory 24, a communications interface 26, a user interface 28, one or more sensors 29 (e.g., a location sensor such as a global navigation satellite system (GNSS) sensor, inertial measurement unit (IMU) and/or motion sensors, camera(s), and/or other components configured to perform various operations, procedures, functions or the like described herein. In at least some example embodiments, the memory 24 is non-transitory.

Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition (HD) radio or other digital radio system, and/or the like. For example, a user apparatus 20 may be in communication with a network apparatus 10 via the network 50. For example, a user apparatus 20 may communicate with the network apparatus 10 via a network, such as the Cloud. For example, the Cloud may be a computer network that provides shared computer processing resources and data to computers and other devices connected thereto.

Certain example embodiments of the network apparatus 10 and user apparatus 20, are described in more detail below with respect to FIGS. 2A and 2B.

FIG. 3 illustrates a block diagram of an example system that is used in an example embodiment. For example, in various embodiments, the network apparatus 10 stores (e.g., in memory 14) program code and/or executable instructions that when executed (e.g., by processor 12) provide a tour/route planning engine 310 and/or territory engine 330. In various embodiments, a tour/route planning engine 310 is an application and/or program (operating on and/or executed by the network apparatus 10) configured to determine a path and/or tour for performing one or more service events having service locations located within the same territory. In various embodiments, a territory engine 330 is an application and/or program (operating on and/or executed by the network apparatus 10) configured to generate one or more candidate territory sets, determine respective servicing values for a current territory set and/or one or more candidate territory sets, identify a preferred territory set from a current territory set and one or more candidate territory sets, and/or the like.

In various embodiments, the network apparatus stores (e.g., in memory 14) a service event database 320. In various embodiments, the service event database 320 stores instances of service event data. In various embodiments, the service event database 320 additionally stores information regarding respective paths used to perform the service events indicated by the instances of service event data.

In various embodiments, a client application and/or program operating on the user apparatus 20 is configured to interface with the tour/route planning engine 310 via a planning application program interface (API). For example, the client application and/or program may submit a tour plan request as a planning API call. For example, the tour plan request may provide a set of instances of service event data corresponding to services dates that have already passed (e.g., historical instances of service event data) and/or corresponding to service dates that are yet to occur (e.g., today, tomorrow, next Wednesday, and/or the like). In an example embodiment, the tour plan request includes information defining and/or identifying the territory set to be used when determining the tour plan. In an example embodiment, the tour plan engine is configured to identify the territory set to be used when determining the tour plan based on the tour plan request and/or by another means (e.g., from a memory cache, a data file defining the territory set stored in memory 14, and/or the like). The tour/route planning engine 310 is configured to determine a tour plan that comprises one or more paths with each path corresponding to a respective territory of the territory set and comprising legs that connect the service locations of each service event located within the respective territory and associated with a particular service date. For example, FIG. 6B illustrates an example tour plan for performing service events 612A, 612B, and 612C in territory 604A via path 614A and for performing service events 612D and 612E in territory 604B via path 614B on a particular service date.

For example, each path comprises a plurality of legs. Each leg has an origin end and a destination end. The origin end of a leg is a respective service location of the service events to be performed within the respective territory on the particular service date and the destination end of the leg is a different respective service location of the service events to be performed within the respective territory on the particular service date. Each path has only one leg and/or at most one leg that has destination end corresponding to a respective service location and only one leg and/or at most leg that has an origin end corresponding to the respective service location.

In various embodiments, the tour/route planning engine 310 has access to map data of a digital map and/or geographic database comprising data records describing a traversable network (e.g., a road network). For example, each leg of a path may comprise one or more segments/links and/or intersections/nodes described and/or defined by the digital map and/or geographic database. For example, in an example embodiment, each path of the tour plan is traversable by a respective mode of transportation (e.g., on foot, by bike, in a vehicle, in an automated and/or self-driving vehicle, and/or the like). For example, in an example embodiment, the tour/route planning engine 310 is configured to generate respective traversable routes for each territory of the territory set that visits each of the service locations located within the respective territory for the particular service date and that minimizes one or more aspects of the route (e.g., total length of the route, expected time to traverse the route, number of left turns along the route, energy consumption for traversing the route, carbon emissions emitted while traversing the route, and/or the like).

After and/or responsive to the tour/route planning engine 310 determining the tour plan (e.g., determining the respective paths for the service events having service locations corresponding to respective territories of the territory set), the tour/route planning engine 310 provides a tour plan response such that the user apparatus 20 receives the tour plan response. In various embodiments, the tour plan response includes information corresponding to the paths of the tour plan. For example, the tour plan response may include an ordered list of service locations for each territory corresponding to the respective paths, respective routes for traversing each of the paths, and/or the like. In an example embodiment, the tour/route planning engine 310 (operating on and/or executed by the network apparatus 10) provides the tour plan response as an API response.

In various embodiments, the user apparatus 20 receives the tour plan response. For example, in an example embodiment, the user apparatus 20 receives the tour plan response as an API response in response to the API call via which the user apparatus 20 provided the tour plan request. In various embodiments, the user apparatus 20 may process the tour plan response, display (e.g., via user interface 28) at least a portion of one or more of the paths of the tour plan, use the information corresponding to the paths of the tour plan to manage a fleet of vehicles (e.g., plan usage and/or maintenance of one or more vehicles of the fleet of vehicles, and/or the like) and/or a group of personnel/contractors, and/or the like.

In various embodiments, the tour/route planning engine 310 causes the instances of service event data received as part of the tour plan request and/or information regarding the tour plan to be stored to a service event database 320. In various embodiments, the service event database 320 is stored in memory 14. The instances of service event data and/or information regarding the tour plan is stored in the service event database 320 for use by a fleet and/or personnel/contractor management engine(s), a territory engine 330, and/or the like.

In various embodiments, the territory engine 330 is configured to use instances of service event data (e.g., historical instances of service event data) to determine servicing values for a current territory set and/or one or more candidate territory sets and identify a preferred territory set therefrom. In various embodiments, the territory engine 330 is configured to determine servicing values for a plurality of territory sets and determine a preferred territory set from the plurality of territory sets responsive to identification of a territory set trigger. In various embodiments, the territory set trigger is identified based on an indication of user input (e.g., based on user input received via user interface 28 and provided by the user apparatus 20), a set schedule (e.g., once a day, once a week, once a month, once every three months, and/or the like), an indication that the defined area data has changed, and/or the like.

In various embodiments, the territory engine 330 accesses instances of service event data (e.g., from the service event database 320). In various embodiments, the territory engine 330 accesses instances of service event data having respective service dates that are within a particular time window (between particular dates, the past week, the past two weeks, the past month, the past two months, the past three months, the past six months, the past year, and/or the like). In an example embodiment, the time window is a sliding time window. For example, the time window may be defined based on the current date (e.g., the previous week, the previous month, the previous six months, and/or the like).

In various embodiments, the servicing value for a territory set is determined based on path servicing values determined for each respective territory of the territory set for each service date present in the instances of service event data. For example, in an example embodiment, each leg of a path is assigned a leg servicing value. The leg servicing values corresponding to the legs of a path are summed to determine the path servicing value. A date servicing value is then determined by summing (e.g., adding together) the path servicing values for all of the groups having the same service date. The date servicing values may then be summed (e.g., added together) to determine a servicing value for the territory set.

In various embodiments, the leg servicing value is determined based at least in part on a length of the leg, a time used and/or predicted for traversing the leg, an amount of energy used or expected to be used to traverse the leg (e.g., an amount of electricity, gasoline, natural gas, diesel, or other fuel used or expected to be used to traverse the leg), an amount of carbon emission emitted and/or expected to be emitted when traversing the leg, how much of the leg can be navigated by an automated and/or self-driving vehicle, and/or other criteria. In various embodiments, the leg servicing value is determined based at least in part on map data from the digital map and/or geographic database and corresponding to the respective leg. A path servicing value for a respective territory for a respective service date is determined by summing the leg servicing values for the territory for the path determined for the respective service date. Summing the respective path servicing values for each of the territories of the territory set for each service date within the time window provides the servicing value for the territory set determined based on the instances of service event data corresponding to the time window.

In an example embodiment, the territory engine 330 is configured to generate the one or more candidate territory sets based at least in part on one or more service provider preferences. For example, in various embodiments, a territory is defined by one or more defined areas. For example, the defined areas may be zip codes, postal codes, neighborhoods, blocks, and/or other predefined geographic areas. A territory is formed from one or more defined areas. For example, a territory is the geographic area corresponding to its constituent defined areas and/or the defined area assigned to the territory. In various embodiments, a territory comprises one or more contiguous defined areas such that each territory is a connected territory (e.g., you can travel to any point within the territory from another point within the territory without leaving the territory). In an example embodiment, a territory may be formed from non-contiguous defined areas such that the territory is not fully connected (e.g., to travel to at least one point within the territory from at least one other point within the territory, you need to exit and then re-enter the territory). In an example embodiment, a territory may not be geographically contiguous but may be topologically connected based on map data of a digital map and/or geographic database encoding a traversable path network (e.g., road network). For example, a territory may include a first defined area and a second defined area that are not geographically connected due to a river or interstate or the like separating the two defined areas. However, a bridge that crosses the river or interstate or the like may topologically connect the first defined area and the second defined area, according to the map data for the geographical region.

In various embodiments, the candidate territory sets are generated based on the defined areas and the service provider preferences. For example, the service provider preferences may include a maximum and/or minimum area of the territories (e.g., square miles, square acres, square meters of each territory); whether or not the territories are required to be contiguous, an average population density of the territories, the number of defined areas within each territory, the number of changes to the defined areas within a respective territory compared to the current territory set, and/or the like.

The respective servicing values for one or more of the candidate territory sets may be determined and compared to the servicing value for the current territory set to determine whether one of the candidate territory sets is preferred over the servicing value for the current territory set. In various embodiments, the servicing value for a territory set is determined based at least in part on leg servicing values assigned to legs of paths of tour plans. In various embodiments, the leg servicing value assigned to a leg is determined based on one or more of the length of the leg, the expected travel time of the leg, energy expenditure along the leg, a difficulty of driving the leg, carbon emissions emitted while traversing the leg, whether the leg is traversable by an automated and/or self-driving vehicle, monetary cost of traversing the leg (e.g., based on energy expenditure (e.g., electricity, gasoline, and/or other fuel expenditure), vehicle wear, labor costs, and/or the like), and/or the like. For example, the servicing value determined for a territory set reflects one or more values, priorities, and/or preferences of the service provider.

In various embodiments, the territory engine 330 is configured to filter the one or more candidate territory sets based on one or more tour constraints. In an example embodiment, the tour constraints comprise one or more of maximum path length, maximum expected time to traverse the path, maximum energy (e.g., gasoline, natural gas, battery stored electricity, and/or the like) expenditure along the path, maximum number of service events along the path (e.g., maximum number of legs of the path), maximum carbon emissions for traversing the path, minimum number and/or percentage of paths that are traversable by an automated and/or self-driving vehicle, and/or the like. In an example embodiment, the territory engine 330 uses map data from the digital map and/or geographic database (e.g., stored in memory 14) to evaluate a path aspect (path length, expected path travel time, expected energy expenditure, number of service events along path and/or number of legs of the path, carbon emissions, traversability of path by an automated and/or self-driving vehicle, and/or the like) and compare the path aspect to the corresponding tour constraint. For example, if an aspect and/or combination of aspects for one or more paths determined for a first territory set do not satisfy a corresponding tour constraint and/or combination of tour constraints, the first territory set is filtered out of and/or removed from the plurality of territory sets. For example, if one or more paths determined for the first territory set are longer than a maximum path length, the first territory set is filtered out of and/or removed from the candidate territory sets.

When a preferred territory set is identified, the territory engine 330 is configured to determine whether the preferred territory set satisfies one or more provision criteria. In an example embodiment, to determine whether the preferred territory set satisfies the one or more provision criteria, the servicing value of the preferred territory set is compared to the servicing value determined for the current territory set. In an example embodiment when the servicing value of the preferred territory set is at least a threshold amount better and/or improved over the servicing value determined for the current territory set, the territory engine 330 determines that the one or more provision criteria are satisfied. In an example embodiment, when the servicing value of the preferred territory is at least a threshold percentage (e.g., 5%, 10%, 15%, and/or the like) better and/or improved over the servicing value determined for the current territory set, the territory engine 330 determines that the one or more provision criteria are satisfied.

In various embodiments, when it is determined that the preferred territory set satisfies the one or more provision criteria, the territory engine 330 provides information corresponding to the preferred territory set for receipt by the user apparatus 20. For example, in an example embodiment, the information corresponding to the preferred territory set may be provided via an API call, an API response, a push communication, and/or the like, such that a client application and/or program operating on the user apparatus 20 receives the information corresponding to the preferred territory set. For example, an example embodiment, the client application and/or program is configured to display (e.g., via user interface 28) a graphical representation of at least a portion of the preferred territory set. In an example embodiment, the territory engine 330 generates and causes a data file encoding the preferred territory set to be stored (e.g., in memory 14, 24). In an example embodiment, a warehouse/loading dock arrangement trigger is generated and/or identified based on the determination that the servicing value for the preferred territory set satisfies the one or more provision criteria. In an example embodiment, the information corresponding to the preferred territory set is provided as input to a warehouse/loading dock planning application and/or program operating on the network apparatus 10 and/or user apparatus 20 and used to determine a warehouse/loading dock arrangement that is then provided and/or used to cause the re-organization and/or arrangement of a real world warehouse/loading dock associated with the service provider.

III. Example Operation

Methods, apparatus, systems, and computer program products are provided in accordance with an example embodiment for determining a preferred territory set and, when the preferred territory set satisfies one or more provision criteria, providing information corresponding to the preferred territory set. For example, a network apparatus 10 may operate and/or execute computer program code, executable instructions, and/or the like to cause a territory engine 330 to determine respective servicing values for a plurality of territory sets, identify/determine a preferred territory set from the plurality of territory sets based at least in part on the respective servicing values, and, when the preferred territory set satisfies the one or more provision criteria, provide information corresponding to the preferred territory set. In various embodiments, the plurality of territory sets comprises the current territory set and/or one or more candidate territory sets.

Example of Determining and Providing a Preferred Territory Set

FIG. 4 provides a flowchart illustrating various processes, procedures, operations, and/or the like that may be performed (e.g., by a network apparatus 10) to identify and/or determine a preferred territory set from a plurality of territory sets and provide information corresponding to the preferred territory set. In various embodiments, a territory set trigger is identified. In various embodiments, the territory set trigger is identified based on an indication of user input (e.g., based on user input received via user interface 28 and provided by the user apparatus 20), a set schedule (e.g., once a day, once a week, once a month, once every three months, and/or the like), an indication that the defined area data has changed, and/or the like. For example, a network apparatus 10 may identify a territory set trigger. For example, the network apparatus comprises means, such as processor 12, memory 14, communication interface 16, user interface 18, and/or the like, for identifying a territory set trigger. The processes, procedures, operations, and/or the like of FIG. 4 are performed after and/or responsive to the identification of the territory set trigger, in an example embodiment.

Starting at block 402, defined area data is obtained. For example, the network apparatus 10 obtains defined area data. For example, the network apparatus 10 comprises means, such as processor 12, memory 14, communications interface 16, and/or the like, for obtaining defined area data. For example, the network apparatus 10 may obtain the defined area data by accessing the defined area from a database and/or data file stored in memory 14. For example, the network apparatus 10 may request and receive the defined area data from the user apparatus 20, another computing entity, Cloud-based data store, and/or the like. In various embodiments, the defined area data includes information identifying the respective geographical area associated with each defined area in association with a defined area identifier configured to identify the area. For example, the defined area data corresponding to a particular defined area includes geographical coordinates (e.g., latitude and longitude) of the perimeter of the defined area and/or information that may be used to determine the geographical coordinates of the perimeter of the defined area in association with the defined area identifier corresponding to the defined area. In various embodiments, the defined areas partition a geographical region associated with the service events of the instances of service event data. For example, FIG. 6A illustrates a geographical region 600 partitioned into defined areas 602A-602I.

At block 404, a plurality of instances of service event data are obtained. For example, the network apparatus 10 obtains a plurality of instances of service event data. For example, the network apparatus 10 comprises means, such as processor 12, memory 14, communication interface 16, and/or the like, for obtaining a plurality of instances of service event data. For example, the network apparatus 10 may obtain the defined area data by accessing the defined area from a database in memory 14 (e.g., the service event database 320). For example, the network apparatus 10 may request and receive the plurality of instances of service event data from the user apparatus 20, another computing entity, Cloud-based data store, and/or the like. In various embodiments, an instance of service data comprises a respective service location indicating a respective location corresponding to the respective service event and a respective service date indicating the respective date on which the service event was or is to be performed. In various embodiments, an instance of service event data may comprise additional information corresponding to the service event, the performance of the service event, and/or the like. In various embodiments, the plurality of instances of service event data consists of the instances of service event data comprising and/or associated with a service date that corresponds to and/or falls within a particular time window. For example, the particular time window may be a sliding time window (e.g., the past week, the past month, the past two months, the past three months, the past six months, the past year, and/or the like).

At block 406, information defining a current territory set is obtained. For example, the network apparatus 10 may obtain information defining a current territory set. For example, the network apparatus 10 comprises means, such as processor 12, memory 14, communication interface 16, and/or the like, for obtaining information defining a current territory set. For example, the network apparatus 10 may obtain the information defining the current territory set by accessing the information defining the current territory set from a database and/or data file in memory 14. For example, the network apparatus 10 may request and receive the information defining the current territory set from the user apparatus 20, another computing entity, Cloud-based data store, and/or the like. In various embodiments, the information defining the current territory set comprises information that indicates which defined areas are within and/or a part of which territories defined by the territory set currently in use by the service provider. For example, the information defining the current territory set may comprise respective lists of one or more defined areas with each list associated with a respective territory identifier configured to identify the respective territory.

At block 408, a plurality of candidate territory sets are generated. For example, the network apparatus 10 generates a plurality of candidate territory sets. For example, the network apparatus 10 comprises means, such as processor 12, memory 14, communication interface 16, user interface 18, and/or the like, for generating a plurality of candidate territory sets. In various embodiments, the candidate territory sets are generated based on service provider preferences. For example, the service provider preferences may indicate that the candidate territory sets should be perturbations of the current territory set. For example, a perturbation so a current territory set may be a candidate territory set within which each territory differs at most from a corresponding territory in the current territory set by the addition of one defined area to the territory and/or the removal of one defined area from the territory. In an example embodiment, one or more candidate territory sets are generated based on a genetic algorithm and the current territory set. In another example, the provider preferences may correspond to territories being connected (e.g., geographically connected and/or topographically connected by a traversable network (e.g., road network)), territories of the territory set being substantially comparable in terms of risk for delay, and/or the like. In an example embodiment, one or more candidate territory sets are generated by a quantum algorithm executed by a quantum computer and received by the network apparatus 10. In an example embodiment, one or more candidate territory sets are generated based on an indication of user input (e.g., via user interface 18, 28) defining one or more territories of a respective candidate territory set. In an example embodiment, the one or more candidate territories are generated based at least in part based on an algorithm used to perform tour planning (e.g., an algorithm used to determine paths within a territory by the tour planning engine 310). In various embodiments, a variety of methods may be used to generate one or more candidate territory sets. For example, one or more rules and/or heuristics may be generated and/or employed (e.g., based on service provider preferences, tour constraints, user input, and/or the like) and one or more candidate territory sets are generated from the defined areas based at least in part on the one or more rules.

In various embodiments, a candidate territory set comprises a respective number of territories. In an example embodiment, each candidate territory set comprises a same respective number of territories. In an example embodiment, each candidate territory set comprises a respective number of territories within a defined range of number of territories. In various embodiments, a candidate territory set comprises one or more defined areas with each defined area of the plurality of defined areas assigned to exactly one territory of the territory set. For example, the territories of a territory set do not overlap with one another.

At block 410, a respective servicing value is determined for each territory set of the current territory set and/or the one or more candidate territory sets based at least in part on the plurality of instances of service event data. For example, the network apparatus 10 determines a respective servicing value for each territory set of the current territory set and/or the one or more candidate territory sets based at least in part on the plurality of instances of service event data. For example, the network apparatus 10 comprises means, such as processor 12, memory 14, and/or the like for determining a respective servicing value for each territory set of the current territory set and/or the one or more candidate territory sets.

In various embodiments, the servicing value for a territory set is determined based at least in part on a total distance traveled to perform the service events on the respective service dates for the territory set, the combined expected time for performing the service events on the respective service dates for the territory set, energy expenditure for performing the respective service dates on the respective service dates for the territory set, a difficulty measure for performing the respective service dates for the territory set (e.g., based on expected traffic conditions for traveling between respective service locations according to a respective path), carbon emissions emitted while performing the service events on the respective service dates for the territory set, a number and/or percentage of path portions for performing the service events for the respective service dates that are traversable by an automated and/or self-driving vehicle, monetary cost of performing the service events on the respective service dates for the territory set (e.g., based on energy expenditure, vehicle wear/maintenance, labor costs, and/or the like), and/or the like.

At block 412, a preferred territory set is identified based at least in part on the respective servicing values. For example, the network apparatus 10 identifies and/or determines a preferred territory set based at least in part on the respective servicing values determined for the plurality of territory sets. For example, the network apparatus comprises means, such as processor 12, memory 14, and/or the like, for identifying and/or determining a preferred territory set based at least in part on the respective servicing values determined for the plurality of territory sets. In an example embodiment, a territory set that has a respective servicing value that represents at least a local extremum (e.g., minimum or maximum) for the respective servicing values is identified as the preferred territory set. For example, in an example embodiment, the territory set associated with the largest servicing value is identified as the preferred territory set. In an example embodiment, the territory set associated with the smallest servicing value is identified as the preferred territory set. In various embodiments, the identifying of the preferred territory set is performed based at least in part on the respective servicing values and at least in part on service provider preferences (e.g., whether a particular aspect and/or combination of aspects of paths are desired to be maximized or minimized, and/or the like).

At block 414, it is determined whether the preferred territory set satisfies one or more provision criteria. For example, the network apparatus 10 determines whether the preferred territory set satisfies one or more provision criteria. For example, the network apparatus 10 comprises means, such as processor 12, memory 14, and/or the like for determining whether the preferred territory set satisfies one or more provision criteria. In an example embodiment, to determine whether the preferred territory set satisfies the one or more provision criteria, the servicing value of the preferred territory set is compared to the servicing value determined for the current territory set. In an example embodiment when the servicing value of the preferred territory set is at least a threshold amount better and/or improved over the servicing value determined for the current territory set, the territory engine 330 determines that the one or more provision criteria are satisfied. For example, in an example embodiment wherein it is desired to minimize the servicing value, it is determined that the preferred territory set satisfies the one or more provision criteria when the servicing value for the preferred territory set is at least a threshold amount less than the servicing value for the current territory set. In an example embodiment, when the servicing value of the preferred territory is at least a threshold percentage better and/or improved over the servicing value determined for the current territory set, the territory engine 330 determines that he one or more provision criteria are satisfied. For example, in an example embodiment wherein it is desired to minimize the servicing value, it is determined that the preferred territory set satisfies the one or more provision criteria when the servicing value for the preferred territory set is at least a threshold percentage less than the servicing value for the current territory set.

When it is determined, at block 414, that the preferred territory set does not satisfy the one or more provision criteria, the process may return to block 404, await the identification of the next territory set trigger, and/or the like. When it is determined, at block 414, that the preferred territory set does satisfy the one or more provision criteria, the process continues to block 416.

At block 416, information corresponding to the preferred territory set is provided. For example, the network apparatus 10 provides information corresponding to the preferred territory set. For example, the network apparatus 10 comprises means, such as processor 12, memory 14, communication interface 16, user interface 18, and/or the like, for providing information corresponding to the preferred territory set. For example, in an example embodiment, the information corresponding to the preferred territory set is provided such that a user apparatus 20 receives the information corresponding to the preferred territory set and displays (e.g., via user interface 28) a graphical representation of at least a portion of the preferred territory set and/or the information corresponding thereto. In an example embodiment, a data file encoding the preferred territory set is generated and stored (e.g., in memory 14, 24). In an example embodiment, a warehouse/loading dock arrangement trigger is generated and/or identified based on the determination that the servicing value for the preferred territory set satisfies the one or more provision criteria. In an example embodiment, the information corresponding to the preferred territory set is provided as input to a warehouse/loading dock planning application and/or program operating on the network apparatus 10 and/or user apparatus 20 and used to determine a warehouse/loading dock arrangement that is then provided and/or used to cause the re-organization and/or arrangement of a real world warehouse/loading dock associated with the service provider.

Example of Determining a Servicing Value for a Territory Set

In various embodiments, a servicing value is determined for a territory set. For example at block 410, a respective servicing value is determined for each of a plurality of territory sets. FIG. 5 provides a flowchart illustrating various processes, procedures, operations, and/or the like for determining a servicing value for a territory set based at least in part on a plurality of instances of service event data, according to an example embodiment.

At block 502, the plurality of instances of service event data are grouped by service date and territory. For example, a territory of the territory set that corresponds to the service location of an instance of service event data (e.g., the service location indicated by the location identifier included in the instance of service event data) is determined. The instance of service event data is then assigned to a group for the territory that corresponds to the service location and the service date of the instance of service event data. For example, a group of instances of service data consists of instances of service event data that have a common service date and that have respective service locations that are located within a common territory. For example, the network apparatus 10 groups the instances of service event data by service date and territory to form groups of instances of service event data such that each group correspond to a respective service date and a respective territory. For example, the network apparatus 10 comprises means, such as processor 12, memory 14, and/or the like, for groping the instances of service data by service date and territory.

At block 504, if the territory set is a candidate territory set, it may be determined whether all of the groups satisfy one or more group criteria, in an example embodiment. For example, if one or more groups have larger than a maximum number of instances of service event data therein, it may be determined that the territory set does not satisfy one or more group criteria. In another example, if one or more groups have less than a minimum number of instances of service event data therein, it may be determined that the territory set does not satisfy one or more group criteria. In another example, if a measure of statistical spread (e.g., variance, standard deviation, and/or the like) of the number of instances of service event data assigned to each group is larger than a maximum measure of statistical spread, it may be determined that the territory set does not satisfy one or more group criteria. In various embodiments, a variety of group criteria may be used based on service provider preferences and tour constraints. In an example embodiment, if one or more groups do not satisfy the one or more group criteria, it is determined that the territory set does not satisfy the one or more group criteria. For example, the network apparatus 10 determines whether the territory set (e.g., all of the groups of the territory set) satisfies one or more group criteria. For example, the network apparatus 10 comprises means, such as processor 12, memory 14, and/or the like, for determining whether the territory set satisfies one or more group criteria (e.g., whether each group satisfies the one or more group criteria).

When, at block 504, it is determined that the territory set does not satisfy one or more group criteria, the process continues to block 506. At block 506, the territory set is filtered out of the plurality of territory sets. For example, the territory set is removed from the plurality of territory sets and/or otherwise flagged as not being available for selection as the preferred territory set. For example, the network apparatus 10 filters the territory set out of the plurality of territory sets. For example, the network apparatus 10 comprises means, such as processor 12, memory 14, and/or the like, for filtering the territory set out of the plurality of territory sets.

When, at block 504, it is determined that the territory set does satisfy the one or more group criteria, the process continues to block 508. At block 508, at least one path is determined for each group. In various embodiments, the at least one path is a set of paths (e.g., a plurality of paths) with each path being configured for a respective vehicle to traverse the path to perform service events located along the respective path. For example, multiple vehicles may be assigned to a same territory with each vehicle assigned a respective path of the set of paths for performing respective service events located along the respective path. For example, the network apparatus 10 determines at least one path for each group. For example, the network apparatus 10 comprises means, such as processor 12, memory 14, and/or the like for determining at least one path for each group. In various embodiments, the paths are determined based at least in part on map data accessed from a digital map and/or geographical database encoding a traversable path network (e.g., a road network, bike path network, and/or the like) for the geographical region corresponding to the territory set.

FIG. 6A illustrates an example geographical region 600. The geographical region 600 is serviced by a service provider and comprises defined areas 602A-602I. The geographical region 600 is divided into two territories 604A, 604B. The first territory 604A comprises defined areas 602A, 602B, 602D, 602E, 602G, and 602H. The second territory 604B comprises defined areas 602C, 602F, and 602I. A square geographical region and square defined areas are illustrated herein as a simple example. However, geographical regions and defined areas may come in and/or be defined to have a variety of (regular and/or irregular) shapes, tilings, and/or tessellations. Additionally, the defined areas need not all be the same size.

FIG. 6B illustrates the example geographical region 600 separated into the first territory 604A and the second territory 604B with the service locations 612A, 612B, 612C, 612D, 612E of an example plurality of instances of service event data for a particular service date shown. Service locations 612A, 612B, and 612C are located within the first territory 604A and correspond to a first group of instances of service event data. A first path 614A is determined for the first group. The first path 614A connects each of the service locations 612A, 612B, 612C for the group and visits each service location only once. For example, one leg has service location 612A as its origin end and 612B as its destination end and the other leg has service location 612B as its origin end and 612C as its destination end.

Service locations 612D and 612E are located within the second territory 604B and correspond to second group of instances of service vent data. A second path 614B is determined for the second group. The second path 614B connects the service locations 612D and 612E and visits each service location only once. For example, the path 614B comprises a leg that has service location 612D as its origin end and service location 612E as its destination end.

In various embodiments, the paths for each group of instances of service event data are determined by a route finding algorithm, tour planning algorithm, and/or other algorithm configured to identify sets of paths corresponding to respective servicing entities (e.g., vehicle, personnel, contractors, and/or the like) between a plurality of locations that minimizes one or more criteria and/or maximizes one or more criteria. For example, the algorithm may be configured to determine paths that have the shortest total path lengths and/or shortest combined total path length, shortest estimated travel time along the paths and/or shortest combined travel time, smallest energy expenditure while traversing the paths and/or smallest combined energy expenditure, and/or the like. In various embodiments, the algorithm uses map data accessed from a digital map and/or geographic database to determine the paths. Notably, each path only visits service locations located within a single territory. For example, the first path 614A does not include a leg having service location 612D as its origin end or as its destination end.

Continuing with FIG. 5, it is determined whether the paths determined for the groups satisfy one or more path criteria. For example, the network apparatus 10 may determine whether the territory set satisfies one or more path criteria. For example, the network apparatus 10 may comprise means, such as processor 12, memory 14, and/or the like, for determining whether the territory set satisfies the one or more path criteria. In an example embodiment, if one or more of the paths do not satisfy the one or more path criteria, it is determined that the territory set does not satisfy the one or more path criteria. In an example embodiment, if at least one path has a length that is longer than a maximum path length, than it is determined that the territory set does not satisfy the one or more path criteria. In an example embodiment, if at least one path has an estimated time of travel time for traversing the path that is longer than a maximum travel time, than it is determined that the territory set does not satisfy the one or more path criteria. In an example embodiment, if at least one path has an expected energy usage that is greater than a maximum energy usage, it is determined that the territory set does not satisfy the one or more path criteria. In an example embodiment, if at least one path has an expected carbon emission value that is greater than a maximum carbon emission value, it is determined that the territory set does not satisfy the one or more path criteria. In an example embodiment, if the number of paths that are traversable by an automated vehicle is not at least a minimum number and/or minimum percentage of the paths, it is determined that the territory set does not satisfy the one or more path criteria. Various path criteria may be used in various embodiments corresponding to the service provider preferences and tour constraints, some of which may be imposed by various contracts, labor laws, vehicle capabilities (e.g., the range of an electric vehicle used to perform service events), and/or the like.

When it is determined, at block 510, that the territory set does not satisfy the one or more path criteria, the process continues to block 506 and the territory set is filtered out of the plurality of territory sets. When it is determined, at block 510, that the territory set does satisfy the one or more path criteria, the process continues to block 512.

At block 512, a path servicing value is determined for each path. For example, the network apparatus 10 determines a path servicing value for each path. For example, the network apparatus 10 comprises means, such as processor 12, memory 14, and/or the like, for determining a path servicing value for each path. For example, in an example embodiment, each leg of a path is assigned a leg servicing value. In various embodiments, the leg servicing value for a leg is determined based at least in part on map data corresponding to one or more lanes or segments of a traversable path network that correspond to the leg. For example, the leg servicing value is determined based at least in part on a length of the leg, a time used and/or predicted for traversing the leg, an amount energy used or expected to be used to traverse the leg, an amount of carbon emission emitted and/or expected to be emitted when traversing the leg, how much of the leg and/or whether or not the leg can be navigated by an automated and/or self-driving vehicle, and/or other criteria. The leg servicing values corresponding to the legs of a path are summed to determine the path servicing value for the path comprising the legs.

At block 514, the path servicing values are summed for each group to determine a servicing value for the territory set. For example, the network apparatus 10 aggregates and/or sums the respective path servicing values for each group to determine the servicing value for the territory set. For example, the network apparatus 10 comprises means, such as processor 12, memory 14, and/or the like, for aggregating and/or summing the respective path servicing values for each group to determine the servicing value for the territory set.

For example, a date servicing value may be determined by summing (e.g., adding together) the path servicing values for all of the groups having the same service date. The date servicing values may then be summed (e.g., added together) to determine a servicing value for the territory set. For example, as shown in FIG. 6C, the servicing value (SV) for performing a set of service events on a first service date 620A for a first territory set 624 comprising first territory 604A and second territory 604B, is the sum of the servicing value for performing a first group 622A of service events within the first territory 604A and the servicing value for performing a second group 622B of service events within the second territory 604B. For example, the servicing value for performing the service events for the first service date 620A is the sum of the path servicing value for path 614A and the path servicing value for path 614B. Additionally, as shown in FIG. 6D, the servicing value for performing both a set of service events on a first service date 620A and another set of service events on a second service date 620B, is the sum of the date servicing value for the first service date 620A and the date servicing value for the second service date 620B. Thus, the sum of the respective path servicing values for each of the groups provides a servicing value for the territory set, in an example embodiment.

In various scenarios, it is possible and/or likely that groups corresponding to the same territory and different service dates may be similar. For example, if the service event is a package or item delivery or pick up, it's possible and/or likely that the group will often include one or more item deliveries or pick-ups along a first road in the territory and one or more deliveries or pick-ups along a second road in the territory. The item deliveries or pick-ups on a first service date and second service date might not be at the same exact location, but may be located along the same road segment such that the paths for the first service date and the second service date are substantially similar (e.g., within a threshold distance and/or threshold distance percentage of one another, within a threshold travel time and/or threshold travel time percentage of one another, etc.). Thus, the path servicing values for the paths for the first service date and the second service date are substantially similar. For example, the path servicing value for the first service date may be used to approximate the path servicing value for the second servicing date.

In an example embodiment, the groups may be analyzed and/or processed to identify and/or determine clusters of substantially similar groups. For example, the respective service locations of groups may be analyzed and/or the respective paths determined for groups may be analyzed and/or processed to identify substantially similar groups. In an example embodiment, a machine learning trained model is used to cluster substantially similar groups. For example, the network apparatus 10 may generate and/or determine clusters of substantially similar groups, in an example embodiment.

In an example embodiment, the path servicing value is determined for a representative member of each cluster. For example, since the groups of a cluster are substantially similar to one another in service locations and/or paths, the path servicing value of one group of the cluster is substantially similar to the respective path servicing values of the other groups in the cluster. In an example embodiment, a representative path servicing value is determined for a representative member of the cluster and then multiplied by the number of groups in the cluster to determine a cluster servicing value. The cluster servicing value is then added together with other cluster servicing values for other clusters and/or path servicing values for groups that are not in a cluster to determine the servicing value for the territory set.

By clustering substantially similar groups and determining a respective representative path servicing value for each identified cluster, computation time and/or processing resources may be reduced for determining the territory set servicing value.

Continuing with FIG. 5, at block 516, the servicing value for the territory set is returned and/or provided. For example, the network apparatus 10 may return and/or provide the determined servicing value for the territory set. For example, the network apparatus 10 may comprise means, such as processor 12, memory 14, and/or the like, for returning and/or providing the determined servicing value for the territory set. For example, an application, program, and/or module configured to determine a servicing value for a territory set may provide the determined servicing value in association with a territory set identifier configured to identify the territory set to an application, program, and/or module configured to identify the preferred territory set from the plurality of territory sets based on the respective servicing values for the territory sets.

Example Providing of Information Corresponding to a Preferred Territory Set

FIG. 7 provides a flowchart of various processes, procedures, operations, and/or the like that may be performed as part of providing information corresponding to a preferred territory set, in various embodiments. For example, one or more of the processes, procedures, operations, and/or the like shown in FIG. 7 may be performed as at least part of block 416, in various embodiments.

Starting at block 702, a graphical representation of at least a portion of the preferred territory set may be displayed. For example, the network apparatus 10 may generate information corresponding to the preferred territory set that includes a graphical representation of at least a portion of the preferred territory set. For example, the network apparatus 10 may comprise means, such as processor 12, memory 14, and/or the like, for generating information corresponding to the preferred territory set that includes a graphical representation of at least a portion of the preferred territory set. For example, the graphical representation of the at least a portion of the preferred territory set may be a map layer and/or an overlay that indicates the boundaries or perimeters of one or more territories of the territory set.

In an example embodiment, the network apparatus 10 displays (e.g., via a display of user interface 18) the graphical representation. In an example embodiment, the network apparatus 10 provides (e.g., transmits) the information corresponding to the preferred territory set that includes the graphical representation For example, the network apparatus 10 may comprise means, such as processor 12, memory 14, and/or communications interface 16) for providing (e.g., transmitting) the information corresponding to the preferred territory set that includes the graphical representation.

In an example embodiment, the user apparatus 20 receives the information corresponding to the preferred territory set that includes the graphical representation. In an example embodiment, processing the information corresponding to the preferred territory set causes the user apparatus 20 to display (e.g., via a display of the user interface 28) the graphical representation (e.g., as a layer of and/or an overlay on a map of at least a portion of the geographical region, and/or the like). For example, the user apparatus 20 may comprise means, such as processor 22, memory 24, communications interface 26, user interface 28, and/or the like, for receiving the information corresponding to the preferred territory set, processing the information corresponding to the preferred territory set, and displaying at least a portion of the graphical representation.

At block 704, a warehouse/loading dock rearrangement trigger is identified. For example, a warehouse and/or a loading dock used for storing and/or organizing/arranging packages, items, supplies, and/or the like corresponding to the service events may be organized and/or arranged based on the territory set. For example, the warehouse or loading dock may have an area corresponding to defined area of the geographical region and the areas corresponding to each defined area are spatially grouped together based on which territory each defined area is assigned. Thus, if a new territory set is to be implemented, the warehouse and/or loading dock may need to be at least partially reorganized and/or rearranged to accommodate the new territory set.

In various embodiments, the network apparatus 10 identifies a warehouse/loading dock rearrangement trigger based on determining that the preferred territory set satisfies the one or more provision criteria. The network apparatus 10 then provides an indication that the warehouse/loading dock rearrangement trigger was identified to the user apparatus 20; another computing entity; an application, program, or module operating on the network apparatus 10 that is configured to determine a warehouse and/or loading dock rearrangement plan; and/or the like. For example, the network apparatus comprises means, such as processor 12, memory 14, communications interface 16, and/or the like, for identifying the warehouse/loading dock rearrangement trigger and providing an indication that the trigger was identified.

At block 706, a warehouse/loading dock rearrangement plan is determined and provided. For example, the network apparatus 10 may determine a plan for rearranging a warehouse and/or loading dock based on the preferred territory set and then provide the plan (e.g., for display via a user interface 18, 28). For example, the network apparatus 10 may comprise means, such as processor 12, memory 14, communication interface 16, user interface 28, and/or the like, for determining a warehouse/loading dock rearrangement plan and providing the warehouse/loading dock rearrangement plan.

In an example embodiment, the viability and/or ability to implement a warehouse/loading dock rearrangement plan may be determined by the network apparatus 10, a warehouse computing apparatus in communication with the network apparatus 10, a human user (e.g., interacting with a user interface 18, 28 of the network apparatus 10 of a network apparatus 10 and/or user apparatus 20). When it is determined that the warehouse/loading dock rearrangement plan is not viable and/or not able to be implemented, a trigger may be generated, determined, and/or identified that causes the network apparatus 10 to determine whether the territory set having the next best servicing value satisfies one or more provision criteria. If the territory set having the next best servicing value does satisfy the one or more provision criteria, that territory set is determined to be the preferred territory set and information corresponding thereto is provided. Otherwise, it is determined that the preferred territory set does not satisfy the one or more provision criteria.

At block 708, the network apparatus 10 generates information corresponding to the preferred territory set and provides the information corresponding to the preferred territory set as input to a fleet, personnel, and/or contractor management application and/or program, such as a fleet route planner, transport management system (TMS), fleet management system (FMS), enterprise resource planning (ERP) system, and/or the like. For example, a fleet, personnel, and/or contractor management application and/or program may be operating on the network apparatus 10, user apparatus 20, and/or another computing entity. The fleet, personnel, and/or contractor management application and/or program may be used to assign vehicles, personnel, contractors, and/or other resources to schedules for performing service events. In various embodiments, the fleet, personnel, and/or contractor management application and/or program assigns such resources to the performance of service events based on the respective service locations associated with the service events and the territories corresponding the respective service locations. Thus, the information corresponding to the preferred territory set may be provided to the fleet, personnel, and/or contractor management application and/or program such that resources may be allocated for service event performance based on the preferred territory set. For example, the network apparatus 10 may comprise means, such as processor 12, memory 14, communications interface 16, and/or the like, for generating information corresponding to the preferred territory set and providing the information corresponding to the preferred territory set as input to a fleet, personnel, and/or contractor management application and/or program.

Depending on the types of service events and/or service provider organization and/or processes for performing service events, information corresponding to the preferred territory set may be provided as input to a variety of other applications, programs, modules, and/or the like.

IV. Technical Advantages

Service providers commonly divide the geographical area within which the service provider performs service events into a set of territories. Each service event within a given territory is serviced by a dedicated one or more service provider units (e.g., service provider vehicles, service provider personnel, service provider contractors, and/or the like). Different territory sets may be preferred based on various service provider preferences and service event tour constraints. The territory set in use is not easily modified or changed as warehouses, loading docks, service provider contracts, and/or the like may be organized based on and/or reference particular territories and/or the in use territory set. Thus, technical problems exist regarding identifying new territory sets that may better fit with service provider preferences, contractual and/or legal obligations, asset capabilities (e.g., such as a path for performing services that does not surpass the range of an electric vehicle used for performing the services), and/or the like compared to a current territory set. Additionally, technical problems exist regarding how to implement a new territory set when a new preferred territory set is identified and/or determined.

Various embodiments provide technical solutions to these technical problems. For example, various embodiments evaluate one or more candidate territory sets using historical instances of service event data to determine whether a candidate territory set would have provided improvements over the current territory set in performing the service events corresponding to the historical instances of service event data. By comparing the servicing value of a preferred territory set (e.g., a best performing candidate territory set) to the servicing value of the current territory set, it can be determined whether the preferred territory set provides enough improvement over the current territory set to be worth the logistical and/or monetary challenges of switching from the current territory set to the preferred territory set. Various embodiments are further configured to aid in switching from the current territory set to the preferred territory set by identifying a warehouse/loading dock rearrangement trigger, determining a warehouse/loading dock rearrangement plan, providing information regarding the preferred territory set to a fleet, personnel, and/or contractor management application and/or program, and/or the like. Thus, various embodiments provide improvements in the fields of territory set determination and implementation, including the rearrangement of warehouses/loading docks and allocation of various resources and/or assets based on the preferred territory set.

In an example embodiment, the preferred territory set is provided as input to a fleet management program, application, and/or the like used to manage servicing the geographical area using a fleet of vehicles and/or personnel/contractors. For example, respective vehicles of a fleet of vehicles may each be assigned to a respective territory of the preferred territory set, routes for respective vehicles may be generated and/or determined based on the preferred territory set, associating generated and/or determined routes with respective vehicles of the fleet may be performed based at least in part on the preferred territory set, and/or the like. Moreover, the preferred territory set effectively reduces the route search area used to determine the routes used by respective vehicles of the fleet and the number of destinations considered for each route during the route planning phase. This enables the tour/route planning engine to operate more efficiently in terms of computational resources and time. Thus, various embodiments provide a variety of technical improvements in the fields of territory set determination and implementation and the allocation of various resources and/or assets to perform services events.

V. Example Apparatus

The network apparatus 10 and/or user apparatus 20 of an example embodiment may be embodied by or associated with a variety of computing devices including, for example, a navigation system including a cellular telephone, a mobile phone, a personal digital assistant (PDA), a watch, a camera, a computer, and/or other device that can perform navigation-related functions, such as digital routing, map display, and/or the like. Additionally or alternatively, the network apparatus 10 and/or user apparatus 20 may be embodied in other types of computing devices, such as a server, a personal computer, a computer workstation, a laptop computer, a plurality of networked computing devices or the like, that are configured to generate candidate territory sets, determine servicing values for territory sets, identify a preferred territory set, determine whether the preferred territory set satisfies one or more provision criteria, assist in the implementation of a preferred territory set, and/or the like.

In an example embodiment, a user apparatus 20 is a user apparatus such as a smartphone, tablet, laptop, client device, desktop computer, and/or the like and a network apparatus 10 is a server, Cloud-based computing system, and/or the like. In this regard, FIG. 2A depicts an example network apparatus 10 and FIG. 2B depicts an example user apparatus 20 that may be embodied by various computing devices including those identified above. As shown, the network apparatus 10 of an example embodiment may include, may be associated with, or may otherwise be in communication with a processor 12 and a memory device 14 and optionally a communication interface 16 and/or a user interface 18. Similarly, a user apparatus 20 of an example embodiment may include, may be associated with, or may otherwise be in communication with a processor 22 and a memory device 24 and optionally a communication interface 26, a user interface 28, one or more sensors 29 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or the like), and/or other components configured to perform various operations, procedures, functions, or the like described herein.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10 and/or user apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor 12, 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22 may include one or more processing cores configured to perform independently. A multi-core processor may enable multiprocessing within a single physical package. Additionally or alternatively, the processor 12, 22 may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. For example, the processor 22 may be configured to execute computer-executable instructions configured to cause a graphical representation of a preferred territory set to be displayed via the user interface 28. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10 and/or user apparatus 20 may include a user interface 18, 28 that may, in turn, be in communication with the processor 12, 22 to provide output to the user, such as graphical representations of a preferred territory set, routes and/or paths corresponding to the performance of service events of a group, warehouse/loading dock rearrangement plans, and/or the like, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24, and/or the like).

The network apparatus 10 and/or user apparatus 20 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The network apparatus 10 and/or user apparatus 20 of an example embodiment may also include or have access to a geographic database that includes a variety of data (e.g., map information/data, at least a portion of a (lane level) network graph representing at least a portion of the traversable network) utilized in constructing a route or navigation path, determining the time to traverse the route or navigation path, matching a geolocation (e.g., a GNSS determined location, such as a service location) to a point on a map, a lane of a lane network, and/or link, and/or the like. For example, a geographic database may include a lane level network graph and/or portion thereof, lane data records, road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, lane data records, POI data records, and/or other data records. In an example embodiment, the network apparatus 10 may be configured to modify, update, and/or the like one or more data records of the geographic database. For example, the network apparatus 10 may modify, update, generate, and/or the like a lane level network graph and/or the corresponding data records, a localization layer (e.g., comprising feature data) and/or the corresponding data records, and/or the like.

In an example embodiment, the connection information/data and/or road segment data records are links or segments, e.g., maneuvers of a maneuver graph, representing roads, streets, or paths, as can be used in the calculated route or recorded route information for determination of one or more personalized routes. The intersection data records are end points corresponding to the respective links or segments of the road segment data records. The road link data records and the intersection data records represent a traversable network, such as used by vehicles, cars, pedestrians, bicyclists, and/or other entities. Similarly, the nodes and connection information/data of the lane level network graph represent a lane network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The road/link segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database (e.g., the lane level network graph) may be generated and/or updated based on information/data provided by a plurality of non-dedicated probe apparatuses. For example, the probe apparatuses may be onboard vehicles owned and/or operated by and/or on behalf of members of the general public such that, for example, new drives used to generate and/or update the lane level network graph may be crowdsourced.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user apparatus developer, can perform compilation on a received geographic database in a delivery format to produce one or more compiled navigation databases. Regardless of the manner in which the databases are compiled and maintained, a navigation system that embodies a network apparatus 10 and/or user apparatus 20 in accordance with an example embodiment may determine the time to traverse a route that includes one or more turns at respective intersections more accurately.

V. Apparatus, Methods, and Computer Program Products

As described above, FIGS. 4, 5, and 7 illustrate flowcharts of a network apparatus 10 and/or user apparatus 20, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the respective apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

That which is claimed:

1. A method comprising:
obtaining, by one or more processors, a plurality of instances of service event data, each instance of service event data comprising a respective location indicator configured to indicate a respective service location associated with a respective service event and a respective service date indicator configured to indicate a respective service date associated with the respective service event;
obtaining, by the one or more processors, defined area data defining a plurality of defined areas, the plurality of defined areas configured to partition a geographical area corresponding to the instances of service event data;
generating, by the one or more processors, a plurality of territory sets, wherein each territory set of the plurality of territory sets comprises a respective number of territories with each territory of the respective number of territories comprising one or more defined areas of the plurality of defined areas such that each defined area of the plurality of defined areas is assigned to exactly one respective territory of the number of territories;
determining, by the one or more processors, a plurality of respective servicing values based at least in part on the plurality of instances of service event data, wherein a respective servicing value is determined for each territory set of the plurality of territory sets and a respective servicing value for a respective territory set is determined based at least in part on at least one path that links the respective service locations located within a particular territory of the territory set on a particular service date;
based on the plurality of respective servicing values, identifying, by the one or more processors, a preferred territory set of the plurality of territory sets; and
responsive to determining that the preferred territory set satisfies one or more provision criteria, causing, by the one or more processors, information corresponding to the preferred territory set to be provided.

2. The method of claim 1, wherein providing information corresponding to the preferred territory set comprises causing a user interface to display a graphical representation of at least a portion of the preferred territory set.

3. The method of claim 1, wherein providing information corresponding to the preferred territory set comprises at least one of (a) determining a warehouse and/or loading dock rearrangement plan or (b) providing an indication that a trigger for determining a warehouse and/or loading dock rearrangement plan has been identified.

4. The method of claim 1, wherein providing information corresponding to the preferred territory set comprises at least one of (a) providing the information corresponding to the preferred territory set to a route planner or (b) assigning respective vehicles of a fleet of vehicles to respective territories, wherein a vehicle of the fleet of vehicles is assigned to only one territory of the preferred territory set.

5. The method of claim 1, wherein determining the respective servicing value for a particular territory set of the plurality of territory sets comprises:
grouping the plurality of instances of service event data into a plurality of groups, each group of the plurality of groups corresponding to a respective service date and a respective territory of the particular territory set;
for each group of the plurality of groups, determining a respective path linking the respective service locations corresponding to the instances of service event data assigned to the group; and
determining a path servicing value for the respective path.

6. The method of claim 5, wherein the servicing value for the territory set is determined by summing the path servicing value for the respective at least one path of each group of the plurality of groups.

7. The method of claim 5, wherein the path servicing value is determined based at least in part on map data corresponding to the respective path.

8. The method of claim 5, wherein the path servicing value is determined based at least in part on at least one of: a length of the respective path, a travel time to traverse the respective path, an energy usage to traverse the respective path, a carbon emission emitted to traverse the respective path, or whether the path is traversable by an automated vehicle.

9. The method of claim 5, further comprising clustering substantially similar groups to form a cluster of groups, wherein determining the path servicing value for the respective path comprises determining a representative path servicing value for the cluster and assigning each group of the cluster the representative path servicing value.

10. The method of claim 1, further comprising filtering the plurality of territory sets based on one or more group criteria and/or path criteria.

11. The method of claim 10, wherein the one or more group criteria and/or path criteria correspond to at least one of a maximum number of instances of service event data in any group of the plurality of groups, a minimum number of instances of service event data in any group of the plurality of groups, a maximum length of any respective path, a maximum travel time of any respective path, a maximum energy usage of any respective path, or a maximum carbon emission of any respective path.

12. The method of claim 1, wherein at least one territory set of the plurality of territory sets is generated by applying a perturbation to a current territory set.

13. The method of claim 12, wherein applying the perturbation to the current territory set comprises changing each territory of the current territory set by no more than removal of one defined area from each territory of the current territory set and addition of one defined area to each territory of the current territory set.

14. The method of claim 1, wherein it is determined that the preferred territory set satisfies the one or more provision criteria when at least one of (a) the respective servicing value for the preferred territory set indicates a set amount of improvement over the respective servicing value for a current territory set or (b) the respective servicing value for the preferred territory set indicates a set percentage of improvement over the respective servicing value for the current territory set.

15. An apparatus comprising at least one processor, a communications interface configured for communicating via at least one network, and at least one memory storing computer program code, the at least one memory and the computer program code configured to, with the processor, cause the apparatus to at least:
obtain a plurality of instances of service event data, each instance of service event data comprising a respective location indicator configured to indicate a respective service location associated with a respective service event and a respective service date indicator configured to indicate a respective service date associated with the respective service event;

obtain defined area data defining a plurality of defined areas, the plurality of defined areas configured to partition a geographical area corresponding to the instances of service event data;

generate a plurality of territory sets, wherein each territory set of the plurality of territory sets comprises a respective number of territories with each territory of the respective number of territories comprising one or more defined areas of the plurality of defined areas such that each defined area of the plurality of defined areas is assigned to exactly one respective territory of the number of territories;

determine a plurality of respective servicing values based at least in part on the plurality of instances of service event data, wherein a respective servicing value is determined for each territory set of the plurality of territory sets and a respective servicing value for a respective territory set is determined based at least in part on at least one path that links the respective service locations located within a particular territory of the territory set on a particular service date;

based on the plurality of respective servicing values, identify a preferred territory set of the plurality of territory sets; and responsive to determining that the preferred territory set satisfies one or more provision criteria, cause information corresponding to the preferred territory set to be provided.

16. The apparatus of claim 15, wherein providing information corresponding to the preferred territory set comprises at least one of (a) causing a user interface to display a graphical representation of at least a portion of the preferred territory set, (b) determining a warehouse and/or loading dock rearrangement plan, (c) providing an indication that a trigger for determining a warehouse and/or loading dock rearrangement plan has been identified, (d) providing the information corresponding to the preferred territory set to a route planner, or (e) assigning respective vehicles of a fleet of vehicles to respective territories, wherein a vehicle of the fleet of vehicles is assigned to only one territory of the preferred territory set.

17. The apparatus of claim 15, wherein determining the respective servicing value for a particular territory set of the plurality of territory sets comprises:

grouping the plurality of instances of service event data into a plurality of groups, each group of the plurality of groups corresponding to a respective service date and a respective territory of the particular territory set;

for each group of the plurality of groups, determining a respective set of paths, wherein one or more paths of the set of paths collectively link respective subsets of the respective service locations corresponding to the instances of service event data assigned to the group; and determining an aggregate path servicing value for the respective set of paths.

18. The apparatus of claim 15, wherein the at least one memory and the computer program code are further configured to, with the processor, cause the apparatus to at least filter the plurality of territory sets based on one or more group criteria and/or path criteria.

19. The apparatus of claim 15, wherein it is determined that the preferred territory set satisfies the one or more provision criteria when at least one of (a) the respective servicing value for the preferred territory set indicates a set amount of improvement over the respective servicing value for a current territory set or (b) the respective servicing value for the preferred territory set indicates a set percentage of improvement over the respective servicing value for the current territory set.

20. A computer program product comprising at least one non-transitory computer-readable storage medium having computer-readable program code portions stored therein, the computer-readable program code portions comprising executable portions configured, when executed by a processor of an apparatus, to cause the apparatus to:

obtain a plurality of instances of service event data, each instance of service event data comprising a respective location indicator configured to indicate a respective service location associated with a respective service event and a respective service date indicator configured to indicate a respective service date associated with the respective service event;

obtain defined area data defining a plurality of defined areas, the plurality of defined areas configured to partition a geographical area corresponding to the instances of service event data;

generate a plurality of territory sets, wherein each territory set of the plurality of territory sets comprises a respective number of territories with each territory of the respective number of territories comprising one or more defined areas of the plurality of defined areas such that each defined area of the plurality of defined areas is assigned to exactly one respective territory of the number of territories;

determine a plurality of respective servicing values based at least in part on the plurality of instances of service event data, wherein a respective servicing value is determined for each territory set of the plurality of territory sets and a respective servicing value for a respective territory set is determined based at least in part on a path that links the respective service locations located within a particular territory of the territory set on a particular service date;

based on the plurality of respective servicing values, identify a preferred territory set of the plurality of territory sets; and responsive to determining that the preferred territory set satisfies one or more provision criteria, cause information corresponding to the preferred territory set to be provided.

* * * * *